United States Patent
Kwon et al.

(10) Patent No.: US 12,309,706 B2
(45) Date of Patent: May 20, 2025

(54) APPARATUS AND METHODS FOR SIDELINK POWER CONTROL WIRELESS COMMUNICATIONS SYSTEMS

(71) Applicant: Huawei Technologies Co., Ltd., Shenzhen (CN)

(72) Inventors: Young Hoon Kwon, Laguna Niguel, CA (US); Pengfei Xia, San Diego, CA (US); Bin Liu, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 444 days.

(21) Appl. No.: 17/633,528

(22) PCT Filed: Aug. 6, 2019

(86) PCT No.: PCT/US2019/045242
§ 371 (c)(1),
(2) Date: Feb. 7, 2022

(87) PCT Pub. No.: WO2020/106336
PCT Pub. Date: May 28, 2020

(65) Prior Publication Data
US 2022/0303909 A1    Sep. 22, 2022

(51) Int. Cl.
*H04W 52/14* (2009.01)
*H04W 16/28* (2009.01)
*H04W 52/24* (2009.01)
*H04W 52/38* (2009.01)

(52) U.S. Cl.
CPC .......... *H04W 52/14* (2013.01); *H04W 16/28* (2013.01); *H04W 52/241* (2013.01); *H04W 52/242* (2013.01); *H04W 52/383* (2013.01)

(58) Field of Classification Search
None
See application file for complete search history.

(56) References Cited

U.S. PATENT DOCUMENTS

| | | | |
|---|---|---|---|
| 11,856,393 B2 * | 12/2023 | Xue | H04W 52/242 |
| 2013/0310103 A1 * | 11/2013 | Madan | H04W 52/242 |
| | | | 455/522 |
| 2014/0370904 A1 * | 12/2014 | Smith | H04W 76/11 |
| | | | 455/450 |

(Continued)

OTHER PUBLICATIONS

ZTE, et al., "Support of unicast, groupcast and broadcast in NR V2X," 3GPP TSG RAN WG1 Meeting #95, R1-1812730, Spokane, USA, Nov. 12-16, 2018, 6 pages.

(Continued)

*Primary Examiner* — Christopher T Wyllie
(74) *Attorney, Agent, or Firm* — Slater Matsil, LLP

(57) ABSTRACT

A method implemented by a first device includes estimating a first pathloss between the first device and a serving access node with respect to a sidelink beam between the first device and a second device, the sidelink beam being used by the first device to make a device-to-device (D2D) transmission to the second device, determining a sidelink transmit power for a sidelink transmission between the first device and the second device in accordance with the first pathloss, and transmitting, to the second device, the sidelink transmission in accordance with the sidelink transmit power.

14 Claims, 11 Drawing Sheets

(56) References Cited

U.S. PATENT DOCUMENTS

| | | | |
|---|---|---|---|
| 2015/0223141 A1* | 8/2015 | Chatterjee | H04W 40/246 |
| | | | 370/329 |
| 2016/0142898 A1* | 5/2016 | Poitau | H04W 8/005 |
| | | | 370/329 |
| 2016/0150484 A1* | 5/2016 | Seo | H04W 52/262 |
| | | | 455/522 |
| 2017/0041882 A1* | 2/2017 | Chae | H04W 52/36 |
| 2017/0215027 A1* | 7/2017 | Yokomakura | H04W 84/02 |
| 2017/0215159 A1* | 7/2017 | Yokomakura | H04W 72/0446 |
| 2018/0206176 A1* | 7/2018 | Panteleev | H04W 28/04 |
| 2018/0242243 A1* | 8/2018 | Kela | H04L 5/0057 |
| 2019/0159174 A1* | 5/2019 | Seo | H04W 76/14 |
| 2019/0165830 A1* | 5/2019 | Bienas | H04W 88/023 |
| 2020/0022089 A1* | 1/2020 | Guo | H04W 52/242 |
| 2020/0037268 A1* | 1/2020 | Zhang | H04W 52/367 |
| 2020/0228247 A1* | 7/2020 | Guo | H04L 1/0025 |
| 2020/0322897 A1* | 10/2020 | Hwang | H04L 1/1861 |
| 2020/0404594 A1* | 12/2020 | Noh | H04W 72/04 |
| 2021/0022091 A1* | 1/2021 | Li | H04W 52/242 |
| 2021/0136699 A1* | 5/2021 | Scholand | H04W 4/40 |
| 2021/0410084 A1* | 12/2021 | Li | H04W 52/265 |
| 2022/0022062 A1* | 1/2022 | Zhu | H04W 76/18 |
| 2022/0078721 A1* | 3/2022 | Xue | H04W 4/70 |
| 2022/0303909 A1* | 9/2022 | Kwon | H04W 52/383 |
| 2022/0361004 A1* | 11/2022 | Kwon | H04W 52/242 |

OTHER PUBLICATIONS

Samsung, "On Physical Layer Procedures for NR V2X," 3GPP TSG RAN WG1 #96, R1-1902274, Athens, Greece, Feb. 25-Mar. 1, 2019. 13 pages.

* cited by examiner

Fig. 7C — Table 770

| GAIN DIFFERENCE [dB] | | SIGNAL DIRECTION (B_J) | | | |
|---|---|---|---|---|---|
| | | B0 | B1 | B2 | B3 |
| BEAM USED (B_I) | B0 | 0 | -5.1 | -10.0 | -5.2 |
| | B1 | -5.3 | 0 | -5.4 | -10.1 |
| | B2 | -10.2 | -5.5 | 0 | -5.6 |
| | B3 | -5.7 | -10.3 | -5.8 | 0 |

Fig. 8B — Table 850

| GAIN DIFFERENCE [dB] | | | SIGNAL DIRECTION (B_J) | | | | | | | |
|---|---|---|---|---|---|---|---|---|---|---|
| | | | B0 | | B1 | | B2 | | B3 | |
| | | | (-45:0) | (0:45) | (-45:0) | (0:45) | (-45:0) | (0:45) | (-45:0) | (0:45) |
| BEAM USED (B_I) | B0 | (-45:0) | 0 | | -5.0 | -7.0 | -11.0 | -9.0 | -3.0 | -5.05 |
| | | (0:45) | | | -3.05 | -5.1 | -9.05 | -11.05 | -9.1 | -5.15 |
| | B1 | (-45:0) | -5.2 | -3.1 | 0 | | -5.25 | -7.1 | -11.2 | -9.15 |
| | | (0:45) | -7.2 | -5.3 | | | -3.15 | -5.35 | -9.2 | -11.25 |
| | B2 | (-45:0) | -11.3 | -9.25 | -5.4 | -3.2 | 0 | | -5.45 | -7.3 |
| | | (0:45) | -9.3 | -11.35 | -7.4 | -5.5 | | | -3.25 | -5.55 |
| | B3 | (-45:0) | -5.6 | -7.5 | -11.4 | -9.35 | -5.65 | -3.3 | 0 | |
| | | (0:45) | -3.35 | -5.7 | -9.4 | -11.45 | -7.6 | -5.75 | | |

Fig. 9B — Table 950

| GAIN DIFFERENCE [dB] | | SIGNAL DIRECTION (B_J) | | | | | | | |
|---|---|---|---|---|---|---|---|---|---|
| | | B0 | | B1 | | B2 | | B3 | |
| | | (-45:0) | (0:45) | (-45:0) | (0:45) | (-45:0) | (0:45) | (-45:0) | (0:45) |
| BEAM USED (B_I) | B0 | 0 | | -3.0 | -7.0 | -10.0 | -10.1 | -7.1 | -3.1 |
| | B1 | -7.2 | -3.2 | 0 | | -3.3 | -7.3 | -10.2 | -10.3 |
| | B2 | -10.4 | -10.5 | -7.4 | -3.4 | 0 | | -3.5 | -7.5 |
| | B3 | -3.6 | -7.6 | -10.6 | -10.7 | -7.7 | -3.7 | 0 | |

APPARATUS AND METHODS FOR SIDELINK POWER CONTROL WIRELESS COMMUNICATIONS SYSTEMS

CROSS-REFERENCE TO RELATED APPLICATIONS

This patent application is a 371 of International Application No. PCT/US2019/045242, filed on Aug. 6, 2019, and entitled "Apparatus and Methods for Sidelink Power Control Wireless Communications Systems" which application is incorporated herein by reference.

TECHNICAL FIELD

The present disclosure relates generally to apparatus and methods for digital communications, and, in particular embodiments, to apparatus and methods for sidelink power control in a wireless communications system.

BACKGROUND

One possible deployment scenario for fifth generation (5G) New Radio (NR) system architecture uses high frequency (HF) (6 gigahertz (GHz) and above, such as millimeter wavelength (mmWave)) operating frequencies to exploit greater available bandwidth and less interference then what is available at the congested lower frequencies. However, pathloss is a significant issue. Beamforming may be used to overcome the high pathloss.

Beamformed beams are typically directional in nature. The directional nature of the beams may complicate communications. As an example, communicating devices with one or more misaligned beams can suffer from temporal link quality degradation. Therefore, there is a need for system and method for adaptive beam control.

SUMMARY

According to a first aspect, a method implemented by a first device is provided. The method includes estimating, by the first device, a first pathloss between the first device and a serving access node with respect to a sidelink beam between the first device and a second device, the sidelink beam being used by the first device to make a device-to-device (D2D) transmission to the second device, determining, by the first device, a sidelink transmit power for a sidelink transmission between the first device and the second device in accordance with the first pathloss, and transmitting, by the first device, to the second device, the sidelink transmission in accordance with the sidelink transmit power.

In a first implementation form of the method according to the first aspect as such, estimating the first pathloss of the beam comprising measuring, by the first device, a reference signal in accordance with the sidelink beam, the reference signal being received from the serving access node.

In a second implementation form of the method according to the first aspect as such or any preceding implementation form of the first aspect, estimating the first pathloss including estimating, by the first device, a second pathloss between the first device and the serving access node with respect to a cellular beam between the first device and the serving access node, the cellular beam being used by the first device to communicate with the serving access node, determining, by the first device, a pathloss compensation between the sidelink beam and the cellular beam, and determining, by the first device, the first pathloss as a combination of the second pathloss and the pathloss compensation.

In a third implementation form of the method according to the first aspect as such or any preceding implementation form of the first aspect, the pathloss compensation comprising an antenna gain difference between the sidelink beam and the cellular beam.

In a fourth implementation form of the method according to the first aspect as such or any preceding implementation form of the first aspect, the pathloss compensation being stored in a memory of the first device.

In a fifth implementation form of the method according to the first aspect as such or any preceding implementation form of the first aspect, estimating the second pathloss, determining the pathloss compensation, and determining the first pathloss as the combination occurring when a compensation condition is met.

In a sixth implementation form of the method according to the first aspect as such or any preceding implementation form of the first aspect, the compensation condition comprising at least one of the cellular beam and the sidelink beams are not adjacent to each other, a signal quality of a signal received on the sidelink beam does not meet a first specified threshold, an antenna gain of the sidelink beam in an angle of arrival (AoA) of the signal does not meet a second specified threshold, an orientation of the sidelink beam is more than a first specified angle threshold away from an orientation of the cellular beam, or the orientation of the sidelink beam is more than a second specified angle threshold away from the AoA of the signal.

In a seventh implementation form of the method according to the first aspect as such or any preceding implementation form of the first aspect, the first device comprising a transmitting user equipment (UE) and the second device comprising a receiving UE.

According to a second aspect, a method implemented by a first device is provided. The method includes determining, by the first device, that first channel quality measurements of a cellular beam between the first device and a serving access node that is serving the first device meets a specified criteria, and based thereon, determining, by the first device, a first sidelink transmit power of a sidelink beam between the first device and a second device in accordance with a first sidelink pathloss between the first device and the serving access node with respect to the sidelink beam, the first sidelink pathloss being measured prior to the first channel quality measurements of the cellular beam, and transmitting, by the first device, to the second device over the sidelink beam, a first frame in accordance with the first sidelink transmit power.

In a first implementation form of the method according to the second aspect as such, further includes determining, by the first device, that second channel quality measurements of the cellular beam fail to meet the specified threshold, and based thereon, estimating, by the first device, a second sidelink pathloss between the first device and the serving access node with respect to the sidelink beam, determining, by the first device, a second sidelink transmit power of the sidelink beam in accordance with the second sidelink pathloss, and transmitting, by the first device, to the second device over the sidelink beam, a second frame in accordance with the second sidelink transmit power.

In a second implementation form of the method according to the second aspect as such or any preceding implementation form of the second aspect, further includes determining, by the first device, that third channel quality measurements of the cellular beam meet the specified threshold, and based thereon, determining, by the first device, a third sidelink transmit power of the sidelink beam in accordance with the second sidelink pathloss measured prior to the third channel quality measurements of the cellular beam, and transmitting, by the first device, to the second device over the sidelink beam, a third frame in accordance with the third sidelink transmit power.

In a third implementation form of the method according to the second aspect as such or any preceding implementation form of the second aspect, further includes determining, by the first device, that an age timer associated with the second sidelink pathloss has met an age threshold, and based thereon, measuring, by the first device, a third sidelink pathloss between the first device and the serving access node with respect to the sidelink beam, determining, by the first device, a fourth sidelink transmit power of the sidelink beam in accordance with the third sidelink pathloss, and transmitting, by the first device, to the second device over the sidelink beam, a fourth frame in accordance with the fourth sidelink transmit power.

According to a third aspect, a first device is provided. The first device includes a non-transitory memory storage comprising instructions, and one or more processors in communication with the memory storage. The one or more processors execute the instructions to estimate a first pathloss between the first device and a serving access node with respect to a sidelink beam between the first device and a second device, the sidelink beam being used by the first device to make a D2D transmission to the second device, determine a sidelink transmit power for a sidelink transmission between the first device and the second device in accordance with the first pathloss, and transmit, to the second device, the sidelink transmission in accordance with the sidelink transmit power.

In a first implementation form of the first device according to the third aspect as such, the one or more processors further executing the instructions to measure a reference signal in accordance with the sidelink beam, the reference signal being received from the serving access node.

In a second implementation form of the first device according to the third aspect as such or any preceding implementation form of the third aspect, the one or more processors further executing the instructions to estimate a second pathloss between the first device and the serving access node with respect to a cellular beam between the first device and the serving access node, the cellular beam being used by the first device to communicate with the serving access node, determine a pathloss compensation between the sidelink beam and the cellular beam, and determine the first pathloss as a combination of the second pathloss and the pathloss compensation.

In a third implementation form of the first device according to the third aspect as such or any preceding implementation form of the third aspect, the pathloss compensation comprising an antenna gain difference between the sidelink beam and the cellular beam.

In a fourth implementation form of the first device according to the third aspect as such or any preceding implementation form of the third aspect, the estimation of the second pathloss, the determination of the pathloss compensation, and the determination of the first pathloss as the combination occurring when a compensation condition is met.

In a fifth implementation form of the first device according to the third aspect as such or any preceding implementation form of the third aspect, the compensation condition comprising at least one of the cellular beam and the sidelink beams are not adjacent to each other, a signal quality of a signal received on the sidelink beam does not meet a first specified threshold, an antenna gain of the sidelink beam in an angle of arrival (AoA) of the signal does not meet a second specified threshold, an orientation of the sidelink beam is more than a first specified angle threshold away from an orientation of the cellular beam, or the orientation of the sidelink beam is more than a second specified angle threshold away from the AoA of the signal.

According to a fourth aspect, a first device is provided. The first device includes a non-transitory memory storage comprising instructions, and one or more processors in communication with the memory storage. The one or more processors execute the instructions to determine that first channel quality measurements of a cellular beam between the first device and a serving access node that is serving the first device meet a specified criteria, and based thereon, determine a first sidelink transmit power of a sidelink beam between the first device and a second device in accordance with a first sidelink pathloss between the first device and the serving access node with respect to the sidelink beam, the first sidelink pathloss being measured prior to the first channel quality measurements of the cellular beam, and transmit, to the second device over the sidelink beam, a first frame in accordance with the first sidelink transmit power.

In a first implementation form of the first device according to the fourth aspect as such, the one or more processors further executing the instructions to determine that second channel quality measurements of the cellular beam fail to meet the specified criteria, and based thereon, estimate a second sidelink pathloss between the first device and the serving access node with respect to the sidelink beam, determine a second sidelink transmit power of the sidelink beam in accordance with the second sidelink pathloss, and transmit, to the second device over the sidelink beam, a second frame in accordance with the second sidelink transmit power.

In a second implementation form of the first device according to the fourth aspect as such or any preceding implementation form of the fourth aspect, the one or more processors further executing the instructions to determine that third channel quality measurements of the cellular beam meet the specified criteria, and based thereon, determine a third sidelink transmit power of the sidelink beam in accordance with the second sidelink pathloss of the sidelink beam measured prior to the third channel quality measurements of the cellular beam, and transmit, to the second device over the sidelink beam, a third frame in accordance with the third sidelink transmit power.

In a third implementation form of the first device according to the fourth aspect as such or any preceding implementation form of the fourth aspect, the one or more processors further executing the instructions to determine that an age timer associated with the second sidelink pathloss has met an age threshold, and based thereon, measure a third sidelink pathloss between the first device and the serving access node with respect to the sidelink beam, determine a fourth sidelink transmit power of the sidelink beam in accordance with the third sidelink pathloss, and transmit to the second device over the sidelink beam, a fourth frame in accordance with the fourth sidelink transmit power.

An advantage of a preferred embodiment is that the power consumption associated with monitoring reference signals is reduced, thereby reducing the overall power consumption of a communications device.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 7C illustrates a first example table of antenna gain difference information according to example embodiments presented herein;

FIG. 8B illustrates a second example table of antenna gain difference information according to example embodiments presented herein;

FIG. 9B illustrates a third example table of antenna gain difference information according to example embodiments presented herein;

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Figure 1:
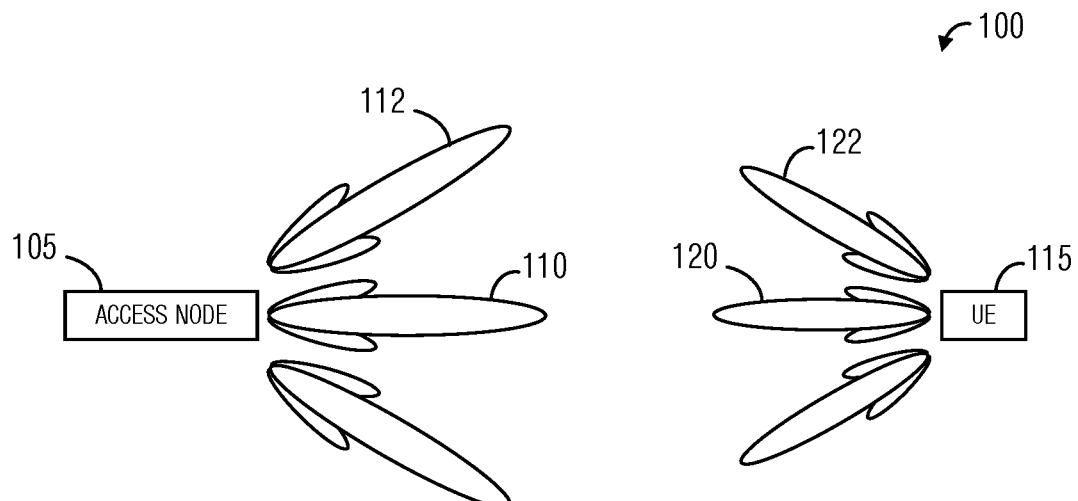
FIG. 1 illustrates an example communications system.

FIG. 1 illustrates an example communications system 100. Communications system 100 includes an access node 105 serving a user equipment (UE) 115. In a first operating mode, communications to and from UE 115 pass through access node 105. In a second operating mode, communications to and from UE 115 do not pass through access node 105, however, access node 105 typically allocates resources used by UE 115 to communicate. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, NR, High Speed Packet Access (HSPA), Wi-Fi 802.11a/b/g/n/ac/ad/ax/ay, etc. While it is understood that communications systems may employ multiple eNBs capable of communicating with a number of UEs, only one eNB and one UE are illustrated for simplicity.

As discussed previously, pathloss in communications systems operating at high frequency (HF) (6 gigahertz (GHz) and above, such as millimeter wavelength (mmWave)) operating frequencies, is high, and beamforming may be used to overcome the high pathloss. As shown in FIG. 1, both access node 105 and UE 115 communicate using beamformed transmissions and receptions. As an example, access node 105 communicates using a plurality of communications beams, including beams 110 and 112, while UE 115 communicates using a plurality of communications beams, including beams 120 and 122.

A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that a UE may rely on codebook-based precoding to transmit uplink signals and receive downlink signals, while a TRP may rely on non-codebook based precoding to form certain radiation patterns to transmit downlink signals or receive uplink signals.

Figure 2:
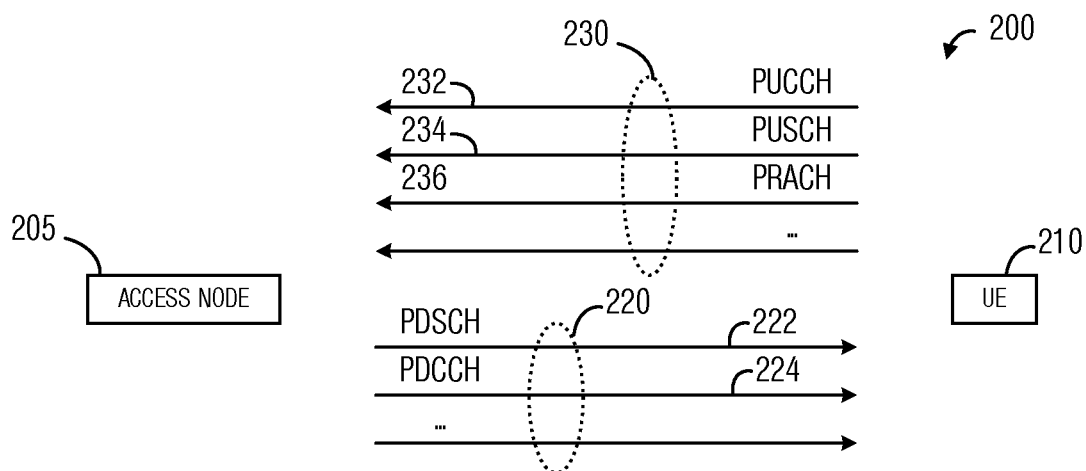
FIG. 2 illustrates a communications system highlighting an example channel structure between an access node and a UE.

FIG. 2 illustrates a communications system 200 highlighting an example channel structure between an access node 205 and a UE 210. In a bi-directional communications implementation, there is a downlink channel 220 and an uplink channel 230 between access node 205 and UE 210. Downlink channel 220 and uplink channel 230 may each include a plurality of unidirectional channels. As shown in FIG. 2, downlink channel 220 includes a physical downlink shared channel (PDSCH) 222 and a physical downlink control channel (PDCCH) 224 among others, while uplink channel 230 includes a physical uplink control channel (PUCCH) 232, a physical uplink shared channel (PUSCH) 234, and a physical random access channel (PRACH) 236, among others. Other channels maybe present in downlink channel 220 or uplink channel 230 but are not shown in FIG. 2.

Figure 3:
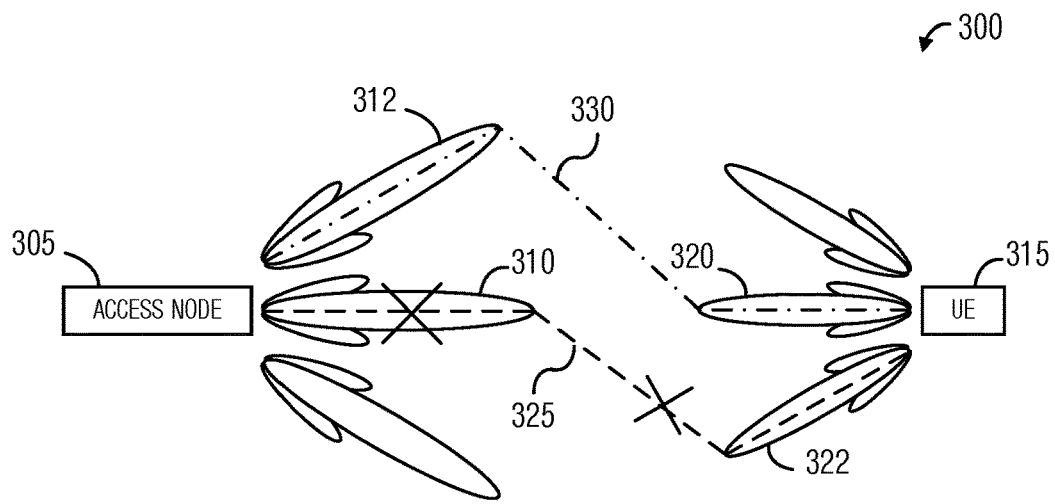
FIG. 3 illustrates a wireless communications system highlighting beam failure and beam failure recovery.

FIG. 3 illustrates a wireless communications system 300 highlighting beam failure and beam failure recovery. Communications system 300 includes an access node 305 serving a UE 315. As shown in FIG. 3, both access node 305 and UE 315 communicate using beamformed transmissions and receptions. As an example access node 305 communicates using a plurality of communications beams, including beams 310 and 312, while UE 315 communicates using a plurality of communications beams, including beams 320 and 322.

Initially, access node 305 and UE 315 are communicating through beam pair link (BPL) 325, which comprises beams 310 and 322. However, due to blockage or UE mobility, BPL 325 fails. UE 315 detects a candidate beam 312 from access node 305 to replace failed beam 310, for example. UE 315 initiates beam failure recovery by sending a beam failure recovery request (BFRQ) to access node 305. Upon completion of the beam failure recovery, BPL 330 is established (comprising beams 312 and 320).

In addition to access node controlled communications, such as described above, a first device may also communicate with a second device without having the communications pass through an access node. This mode of communications is commonly referred to as device-to-device (D2D) communications. In D2D communications, two devices directly exchange information without having the communications passing through an access node. Transmissions between the two devices are known as sidelink transmissions. However, one or both of the two devices may also be served by an access node, and the D2D communications may be enabled by the access node. The two devices may be UEs, or a combination of a UE and some other communications device, such as a sensor, a vehicle, a repeater, etc. The communications between the two devices may or may not be beamformed. Vehicle-to-anything (V2X) communications is another form of D2D communications.

When two or more reference signals, data signals, or resources are related in such a way that the two or more reference signals, data signals, or resources may be viewed as possessing similar characteristics, they are said to possess a quasi collocated (QCL) relationship or that they are QCL'ed. QCL relationships may refer to time, frequency, code, or spatial relationships between two or more reference signals, data signals, or resources, while spatial QCL refers to only spatial relationships between two or more reference signals, data signals, or resources. The spatial QCL information may include associations between signals and resources, such as channel status information-reference signal (CSI-RS) resources and wideband reference signals (WBRS), or associations between individual WBRSs, or associations between CSI-RS resources and beamformed random access channels (BRACHs). As an example, in a one to one association, each CSI-RS signal is associated with one WBRS such that the transmit precoder for the CSI-RS signal is the same as a transmit precoder for the WBRS. As another example, each CSI-RS signal is associated with one WBRS such that the transmit precoder for the CSI-RS signal is the same as a transmit precoder for the WBRS. As another example, a first WBRS is associated with a second WBRS such that the transmit precoder for the second WBRS is the same as that for the first WBRS. It is possible that multiple CSI-RS signals are associated with a single WBRS, and vice versa. The spatial QCL information may be stored in tabular form or in a memory of a device. The spatial QCL information includes associations between CSI-RS and WBRSs. The spatial QCL information may be used by the UE to determine CSI-RS beam indices from WBRS beam indices, and vice versa, for example. As an example, in a one to one association, each CSI-RS signal is associated with one WBRS. It is possible that multiple CSI-RS signals are associated with a single WBRS, and vice versa.

It is noted that as used in the discussion presented herein, the term QCL may generally refer to both QCL and spatial QCL. In circumstances where such usage would lead to confusion, spatial QCL will be used as needed.

Transmit power control is an important component in radio resource management of modern communications systems. A goal of transmit power control is to maximize the receive power of transmitted signals while limiting the interference generated by the transmitted signals at unintended receiving devices. As an example, in the 5G NR technical standards, if a UE transmits on a channel (such as a PUSCH) on an active uplink (UL) bandwidth-part (BWP) b of a carrier f of a serving cell c using a parameter set configuration with index j and a PUSCH power control adjustment state with index 1, the UE determines the PUSCH transmission power P_{PUSCH, b, f, c} (i, j, q_d, l) in a PUSCH transmission occasion i, which is expressible as:

$$P_{PUSCH,b,f,c}(i, j, q_d, l) = \min \begin{cases} P_{CMAX,f,c}(i) \\ P_{O_{PUSCH},b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \\ \Delta_{TF,b,f,c}(i) + f_{b,f,c}(i, l) \end{cases}$$

where: $P_{CMAX,f,c}(i)$ is the configured UE transmit power for carrier f of serving cell c in PUSCH transmission occasion i; $P_{O_{PUSCH},b,f,c}(f)$ is a parameter composed of the sum of a component $P_{O_{PUSCH\_NOMINAL},f,c}(j)$ and a component $P_{O_{UE\_PUSCH},b,f,c}(j)$; $\alpha_{b,f,c}(j)$ is a pathloss compensation factor; $M_{RB,b,f,c}^{PUSCH}(i)$ is the bandwidth of the PUSCH resource assignment expressed in number of resource blocks (RBs) for PUSCH transmission occasion i on active UL BWP b of carrier f of serving cell c; μ is a SCS configuration; and $PL_{b,f,c}(q_d)$ is a downlink (DL) pathloss estimate in dB calculated by the UE using reference signal (RS) index q_d for the active DL BWP of serving cell c.

In the NR V2X SI agreements, sidelink (SL) open-loop power control is supported. In the case of unicast, groupcast, and broadcast, sidelink open-loop power control is based on the pathloss between the transmitting UE and the access node when the transmitting UE is in the coverage of the access node. This allows for the mitigation of the interference to the UL reception at the access node. 3GPP LTE Release 14 sidelink open-loop power control is used as the baseline, and the access node is able to enable or disable the open-loop power control. In the case of unicast, open-loop power control is also based on the pathloss between the transmitting UE and the receiving UE. Preconfiguration or configuration is able to enable to disable the open-loop power control. Additional study is needed to determine if this will be applicable to groupcast or additional signaling for sidelink operation is needed. Additional work for closed-loop power control is needed.

Figure 4:
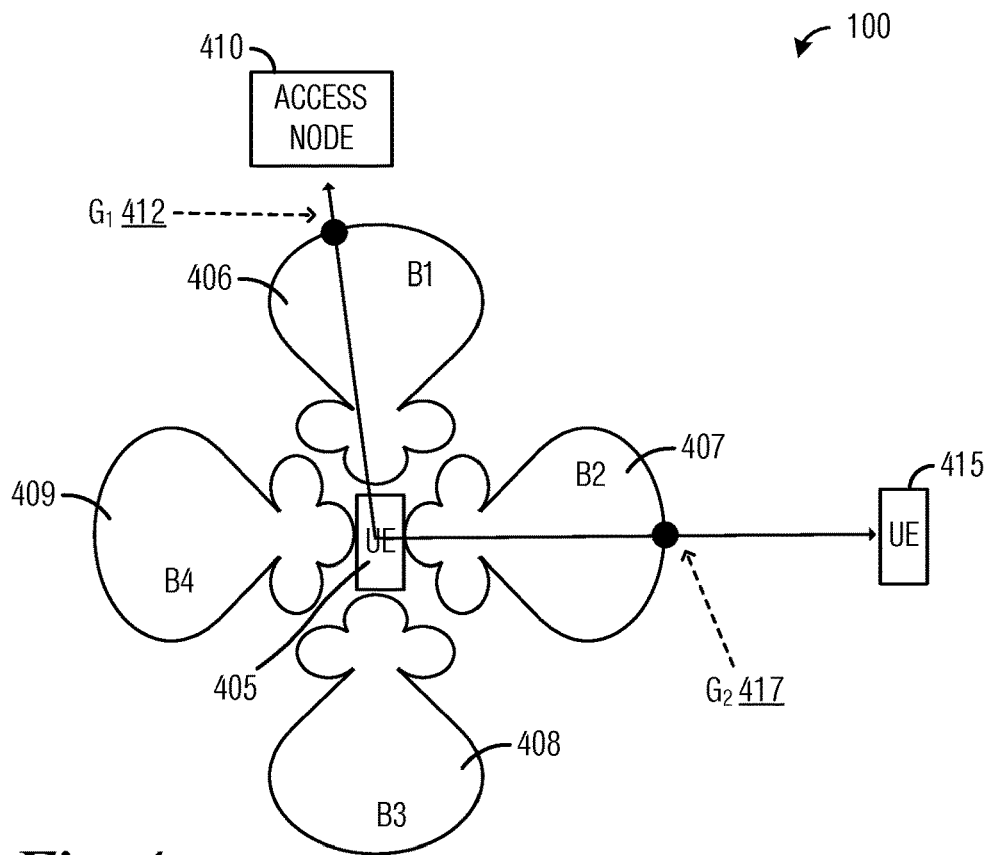
FIG. 4 illustrates a communications system highlighting the impact of a device-to-device (D2D) transmission.

FIG. 4 illustrates a communications system 400 highlighting the impact of a D2D transmission. Communications system 400 includes a first UE 405 that is served by an access node 410. In addition to being served by access node 410, first UE 405 is transmitting to a second UE 415. First UE 405 is configured with four communications beams B1 406, B2 407, B3 408, and B4 409. As shown in FIG. 4, beam B1 406 is oriented towards access node 410, while beam B2 407 is oriented towards second UE 415. As such, communications to or from access node 410 occur using beam B1 406. Similarly, communications to or from second UE 415 occur using beam B2 407.

In general, first UE 405 separately manages the beams for communication with access node 410 and second UE 415. Hence, different beam gain is considered in determining pathloss to access node 410 versus pathloss to second UE 415 when utilizing transmission power control. The beam gains are implicitly considered when first UE 405 measures the reference signal received power (RSRP) of the power control RS (q_d) using the associated beam. As shown in FIG. 4, beam gain G1 412 is considered in the pathloss to access node 410, while beam gain G2 417 is considered in the pathloss to second UE 415.

Under current 5G NR V2X technical standards, which is under development, one technique used to determine the transmit power for a sidelink transmission (such as transmission over a physical sidelink control channel (PSCCH) or a physical sidelink shared channel (PSSCH)) considers the pathloss between a transmitting UE (e.g., first UE 405 of FIG. 4) and an access node (e.g., access node 410 of FIG. 4). The pathloss between the transmitting UE and the receiving UE may be considered for a unicast transmission. The rationale for considering the pathloss between the transmitting UE and the serving access node is to control the interference of the sidelink transmission on the serving access node's uplink reception. The pathloss between the transmitting UE and the serving access node is measured and used in the determining of the transmission power of the transmitting UE's transmission to the access node.

With regard to estimating the pathloss between the transmitting UE and the serving access node with respect to the beam used by the transmitting UE to communicate with the receiving UE (referred to herein after as sidelink beam), if the beam used to communicate with the serving access node (referred to herein after as cellular beam) is used in estimating the pathloss between the transmitting UE and the serving access node associated with a D2D transmission, the estimation used for D2D communications may be incorrect. In general, using the pathloss between the transmitting UE and the serving access node associated with using the cellular beam to estimate the pathloss between the transmitting UE and the serving access node associated with using the sidelink beam may result in an incorrect estimation because the beam gain of the cellular beam is typically different from the beam gain of the sidelink beam.

Figure 5:
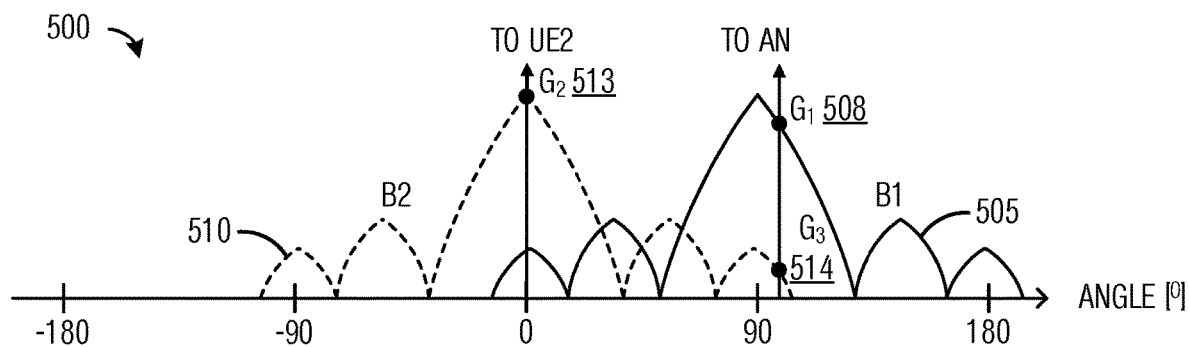
FIG. 5 illustrates antenna pattern diagrams highlighting the problem that may arise from the use of the cellular beam to estimate the pathloss between the transmitting UE and the serving access node associated with using the sidelink beam.

FIG. 5 illustrates antenna pattern diagrams 500 highlighting the problem that may arise from the use of the cellular beam to estimate the pathloss between the transmitting UE and the serving access node associated with using the sidelink beam. Antenna pattern diagrams 500 displays traces of two beams, a cellular beam and a sidelink beam, of a first UE. A first trace 505 represents an antenna pattern diagram of a cellular beam used for communications (e.g., downlink or uplink) with a serving access node, and a second trace 510 represents an antenna pattern diagram of a sidelink beam used for communications with a second UE. As shown in FIG. 5, the serving access node is oriented at approximately 100 degrees to the first UE. An uplink transmission by the first UE to the serving access node would utilize the cellular beam and would have a beam gain G1 508. Similarly, the second UE is oriented at approximately 0 degrees to the first UE. A sidelink transmission by the first UE to the second UE would utilize the sidelink beam and would have a beam gain G2 513.

However, a sidelink transmission using the sidelink beam may cause interference to the serving access node. As shown in FIG. 5, at approximately 100 degrees, a transmission using the sidelink beam would have a beam gain G3 514. Although beam gain G3 514 is significantly less than beam gain G1 508, it is non-zero and the serving access node would experience interference from the sidelink transmission.

As discussed above, if the cellular beam is used in the estimation of the pathloss between the transmitting UE and the serving access node when a transmission is taking place over the sidelink beam, the result may be incorrect. This is because the transmitting UE is transmitting to the receiving UE using the sidelink beam, not the cellular beam. Hence, using the cellular beam in the pathloss estimation may result in an incorrect estimation. Therefore, there is a need for systems and methods for sidelink power control in a wireless communications system.

According to an example embodiment, a transmitting UE determines the transmit power of a sidelink transmission in accordance with an estimated pathloss between the transmitting UE and a serving access node of the transmitting UE, wherein the estimated pathloss includes the antenna gain of the sidelink beam. In other words, the transmit power of the sidelink transmission is determined using the antenna gain of the sidelink beam. By estimating the pathloss between the transmitting UE and the serving access node utilizing the sidelink beam, the impact of interference at the serving access node arising from the sidelink transmission is considered, thereby helping to ensure that the transmit power is set properly.

In an embodiment, a transmitting UE estimates the pathloss between the transmitting UE and a serving access node using a sidelink beam (i.e., the beam used to transmit to a receiving UE) instead of a cellular beam (i.e., the beam used to transmit to the serving access node or to receive from the serving access node). The transmitting UE measures a power control reference signal q_d using the sidelink beam. The transmitting UE also measures q_d using a cellular beam for the purposes of uplink power control. If the transmitting UE has more than one receive antenna panel, this can be readily accomplished. If the transmitting UE has only one receive antenna panel, the transmitting UE can only measure q_d with one beam (either the sidelink beam or the cellular beam) at a time. In such a situation, the transmitting UE alternates between using the sidelink beam and the cellular beam to measure q_d at consecutive instances of q_d, for example.

Figure 6A:
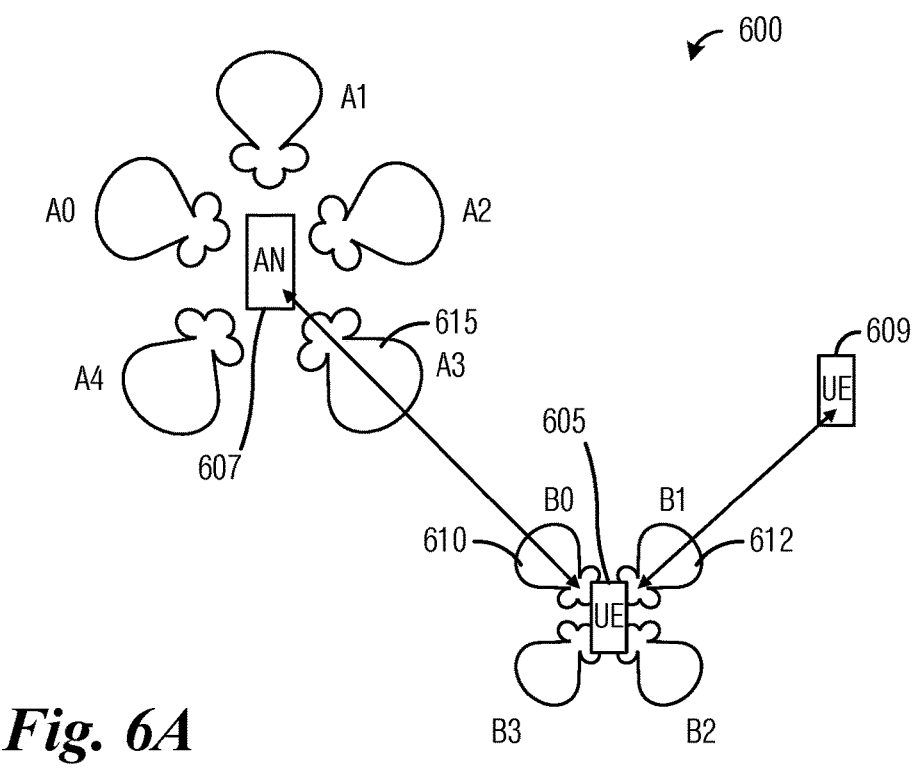
FIG. 6A illustrates a communications system highlighting an example of how a transmitting UE estimates the pathloss between the transmitting UE and a serving access node while transmitting using a sidelink beam according to example embodiments presented herein.

FIG. 6A illustrates a communications system 600 highlighting an example of how a transmitting UE estimates the pathloss between the transmitting UE and a serving access node while transmitting using a sidelink beam. Communications system 600 includes a first UE 605 that operates as a transmitting UE. First UE 605 communicates with a serving access node 607 and a second UE 609 operating as a receiving UE. First UE 605 communicates with serving access node 607 using beam B0 610 and communicates with second UE 609 using beam B1 612. Serving access node 607 uses beam A3 615 to communicate with first UE 605.

Figure 6B:
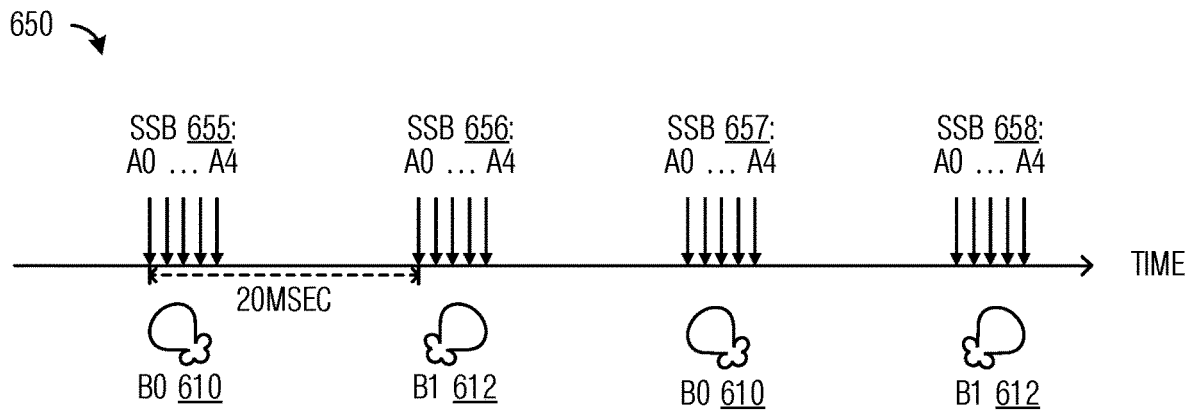
FIG. 6B illustrates a timing diagram highlighting an example of how a transmitting UE estimates the pathloss between the transmitting UE and a serving access node using a sidelink beam according to example embodiments presented herein.

FIG. 6B illustrates a timing diagram 650 highlighting an example of how a transmitting UE estimates the pathloss between the transmitting UE and a serving access node using a sidelink beam. Timing diagram 650 corresponds to communications system 600 of FIG. 6A. For discussion purposes, consider the following situation:

The serving access node configures a synchronization signal block (SSB) as a power control RS q_d, with the SSB being transmitted at 20 msec intervals. The serving access node transmits the SSB with five different beams (beams A0-A4).

The transmitting UE switches its receive beam between beams B0 610 and B1 612 for each 20 msec interval to measure q_d.

As shown in FIG. 6B, a sequence of SSBs, such as SSB 655-658, conveys q_d over time. The transmitting UE uses a first beam B0 610 (which is the cellular beam in this example) to measure q_d conveyed by SSB 655. The transmitting UE uses a second beam B1 612 (which is the sidelink beam in this example) to measure q_d conveyed by SSB 656. The transmitting UE may continue with the measurements of q_d for SSB 657 and SSB 658. Although FIG. 6B illustrates an example where the transmitting UE initially measures q_d using the cellular beam, the example embodiments are operable with the transmitting UE initially measuring q_d using the sidelink beam. Additionally, it is shown that the transmitting UE continues to alternatively measure q_d using the cellular beam and the sidelink beam, the example embodiments are operable with the transmitting UE making only one (or any other specified number) measurement of q_d using the cellular and sidelink beams.

However, because the serving access node is in the direction of beam B0 610, the use of beam B1 612 to receive the SSB may incur meaningless overhead because the transmitting UE typically cannot obtain system information delivered in the SSB due to poor channel condition. Hence, it may take a longer time (on the order of 40 msec) for the transmitting UE to update q_d, which may lead to worse power control accuracy (due to changing channel condition, for example). Furthermore, the transmitting UE needs to switch its receive beam repeatedly to receive the SSB using beams B0 610 and B1 612, even if the channel remains steady, thereby leading to potentially unstable behavior.

According to an example embodiment, a transmitting UE estimates the pathloss between the transmitting UE and a serving access node using a sidelink beam instead of a cellular beam, where the transmitting UE uses antenna gain difference information to compensate for the difference in antenna gain of the sidelink beam and the cellular beam. The antenna gain difference information comprises a value that is the difference (in the antenna gain) between the cellular beam and the sidelink beam. The use of the antenna gain difference information to compensate for the difference in antenna gain of the sidelink beam and the cellular beam eliminates the necessity to make measurements using both the sidelink beam and the cellular beam. Hence, the transmitting UE only estimates the pathloss between the transmitting UE and the serving access node using the cellular beam. Eliminating the need to make estimates (and hence measurements) using both the sidelink and cellular beams is especially beneficial for transmitting UEs with a single receive antenna panel, due to less beam switching.

In an embodiment, the antenna gain difference information comprises compensation values that enable the estimation of the pathloss or RSRP of a sidelink beam I by estimating the pathloss or RSRP of a cellular beam J and then applying the compensation value associated with the sidelink beam I and a cellular beam J. However, because the actual beam gain difference may differ depending on the exact location or direction of the serving access node, there exists some error associated with only using the antenna gain difference information. Hence, it is possible to have an additional margin in addition to the antenna gain difference compensation values so that a probability of the estimated pathloss being greater than the actual pathloss is low, even in the presence of an error in the antenna gain difference information. As an example, the estimated pathloss is expressible as $$PL\_sidelinkI = PL\_cellularJ + compensation\_value\_IJ + gain\_margin,$$

where PL_sidelinkI is the estimated pathloss for sidelink beam I, PL_cellularJ is the estimated pathloss for cellular beam J, compensation_value_IJ is the antenna gain difference compensation value associated with sidelink beam I and cellular beam J, and gain_margin is margin for the antenna gain difference compensation value to make the probability that the estimated pathloss is greater than the actual pathloss is low. In an embodiment, the margin (e.g, gain_margin) is a negative dB value.

Figure 7A:
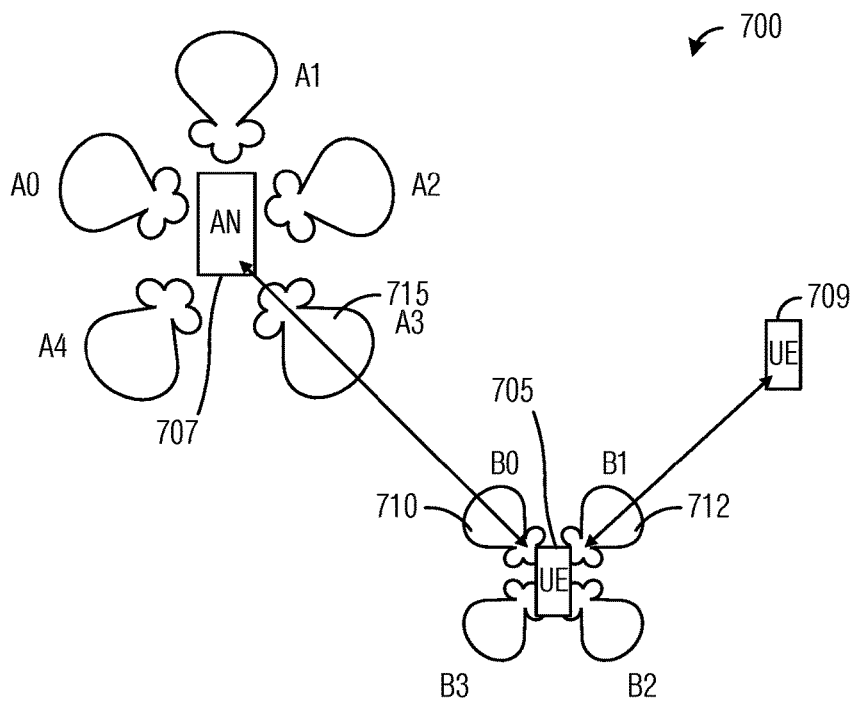
FIG. 7A illustrates a communications system highlighting an example of how a transmitting UE estimates the pathloss between the transmitting UE and a serving access node while transmitting using a sidelink beam, where the transmitting UE uses antenna gain difference information to simplify the estimation process according to example embodiments presented herein.

FIG. 7A illustrates a communications system 700 highlighting an example of how a transmitting UE estimates the pathloss between the transmitting UE and a serving access node while transmitting using a sidelink beam, where the transmitting UE uses antenna gain difference information to simplify the estimation process. Communications system 700 includes a first UE 705 that operates as a transmitting UE. First UE 705 communicates with a serving access node 707 and a second UE 709 operating as a receiving UE. First UE 705 communicates with serving access node 707 using beam B0 710 and communicates with second UE 709 using beam B1 712. Serving access node 707 uses beam A3 715 to communicate with first UE 705. First UE 705 includes antenna gain difference information to eliminate the need to make measurements (using the sidelink beam) of q_d transmitted by serving access node 707.

Figure 7B:
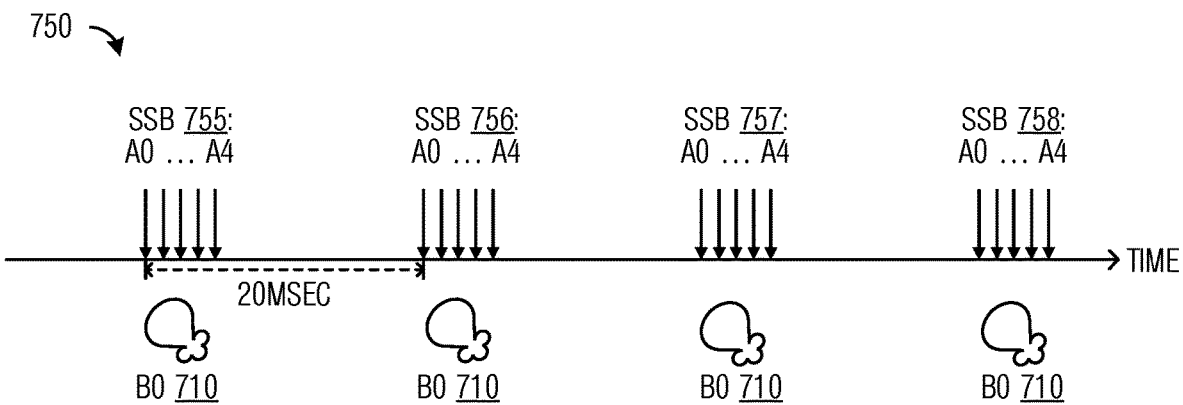
FIG. 7B illustrates a timing diagram highlighting an example of how a transmitting UE estimates the pathloss between the transmitting UE and a serving access node while transmitting using a sidelink beam, where the transmitting UE uses antenna gain difference information to simplify the estimation process according to example embodiments presented herein.

FIG. 7B illustrates a timing diagram 750 highlighting an example of how a transmitting UE estimates the pathloss between the transmitting UE and a serving access node while transmitting using a sidelink beam, where the transmitting UE uses antenna gain difference information to simplify the estimation process. Timing diagram 750 corresponds to communications system 700 of FIG. 7A. As shown in FIG. 7B, a sequence of SSBs, such as SSB 755-758, conveys q_d over time. The transmitting UE uses a first beam B0 710 (which is the cellular beam in this example) to measure q_d conveyed by SSB 755. Because of the use of the antenna gain difference information, the transmitting UE does not have to make measurements of q_d using the sidelink beam to estimate the pathloss between the transmitting UE and the serving access node using the sidelink beam. Hence, the transmitting UE also uses first beam B0 710 to measure q_d conveyed by SSB 756 (as well as subsequent SSBs, as needed).

In an embodiment, to estimate the pathloss between the transmitting UE and the serving access node using the sidelink beam instead of the cellular beam, the transmitting UE estimates the pathloss between the transmitting UE and the serving access node using the cellular beam and combines the estimated pathloss with the antenna gain difference information corresponding to the cellular and sidelink beams to determine the estimated pathloss between the transmitting UE and the serving access node using the sidelink beam. The process may be expressed mathematically as:

$$PL_{SL}=PL_{cell}+\text{Gain\_Compensation}_{cell,SL},$$

where: $PL_{SL}$ is the estimated pathloss between the transmitting UE and the serving access node using the sidelink beam; $PL_{cell}$ is the estimated pathloss between the transmitting UE and the serving access node using the cellular beam; and Gain_compensation$_{cell,SL}$ is the antenna gain difference information corresponding to the cellular and sidelink beams.

In an embodiment, the antenna gain difference information is stored in the transmitting UE. The antenna gain difference information may be generated by the transmitting UE. The transmitting UE may generate the antenna gain difference information by making measurements of q_d, other RS, transmissions, etc., while it is not making sidelink transmissions, for example. As an example, the transmitting UE may make measurements to generate the antenna gain difference information when the transmitting UE is initializing or connecting to a network. As another example, the transmitting UE may make measurements to generate the antenna gain difference information after powering on. As another example, the transmitting UE may make measurements to generate the antenna gain different information prior to connecting to a network. As another example, the measurements to generate the antenna gain difference information may be made during calibration of the transmitting UE. The antenna gain difference information may be present internal values (such as those generated during calibration) or measurements that may be updated (such as those generated through measurements made while the transmitting UE is in operation).

In an embodiment, the antenna gain difference information is stored in a tabular format. As an example, the table of antenna gain difference information is a two-dimensional table, with Entry(I, J) corresponding to the antenna gain difference compensation value for a difference in antenna gain present when estimating the pathloss of receive antenna I for a signal originating from SS source with an orientation corresponding to the receive antenna J, when receive beam J is used for pathloss measurement. Therefore, the I dimension (the rows of the table of antenna gain difference information) corresponds to the sidelink beam direction, and the J dimension (the columns of the table of antenna gain difference information) corresponds to the cellular beam direction. Hence, Entry (I, J) corresponds to the antenna gain difference compensation value for the difference in antenna gain present when estimating the pathloss of receive beam I (the sidelink beam direction) for a signal with orientation that best matches receive beam J (the cellular beam direction). In an embodiment, the values in the tables are in dB.

FIG. 7C illustrates a first example table 770 of antenna gain difference information. As shown in FIG. 7C, table 770 is a two-dimensional table, where a value stored in entry (I, J) is the antenna gain difference usable in compensating for the difference in antenna gain present when estimating the pathloss of receive beam I for a signal with an orientation that best matches receive beam J. As an example, the value in entry (B1, B3) 775 is −10.1 dB, which represents that −10.1 dB of compensation is needed when estimating the pathloss of receive beam B1 for a signal with an orientation that best matches receive beam B3. Therefore, in order to estimate the pathloss between the transmitting UE and the serving access node using receive beam B1, the transmitting UE estimates the pathloss between the transmitting UE and the serving access node using receive beam B3 and adds the value in entry (B1, B3). As another example, in order to estimate the pathloss between the transmitting UE and the serving access node using receive beam B1 when the cellular beam is receive beam B0 (such as shown in FIG. 7A), the transmitting UE estimates the pathloss between the transmitting UE and the serving access node using receive beam B0 and adds the value in entry (B1, B0) 780.

In an embodiment, the transmitting UE identifies angle of arrival (AoA) information of the signal (e.g., q_d) from serving access node or the signal to the receiving UE, and adds the AoA information to the antenna gain difference information. The addition of the AoA information to the antenna gain difference information results in the antenna gain difference information being a function of the AoA of the signal from the serving access node or the signal to the receiving UE. The addition of the AoA information may result in the transmitting UE being able to obtain increased accuracy in the estimation of the pathloss. The transmitting UE may also be able to maintain less margin for the antenna gain difference information due to the increased accuracy.

Figure 8A:
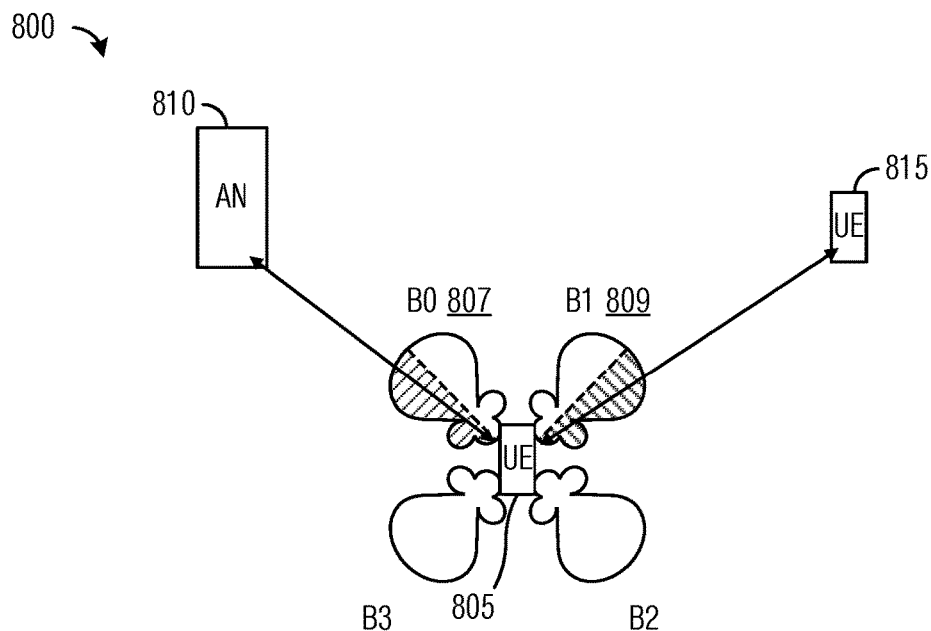
FIG. 8A illustrates a communications system highlighting an example of how a transmitting UE estimates the pathloss between the transmitting UE and a serving access node while transmitting using a sidelink beam, where the antenna gain difference information includes AoA information according to example embodiments presented herein.

FIG. 8A illustrates a communications system 800 highlighting an example of how a transmitting UE estimates the pathloss between the transmitting UE and a serving access node while transmitting using a sidelink beam, where the antenna gain difference information includes AoA information. Communications system 800 includes a transmitting UE 805 communicating with a serving access node 810 and a receiving UE 815. Transmitting UE 805 communicates using beams, such as beam B1 807 and B2 809. Each beam has a coverage of 90 degrees, and each beam is sub-divided into two sub-beams, e.g., (−45, 0) and (0, 45). The sub-beam information is added to the antenna gain difference information. Transmitting UE 805 is able to utilize the sub-beam information to refine the antenna gain difference information. Although the discussion of communications system 800 focuses on a situation where each beam is sub-divided into two sub-beams, the example embodiments presented herein are operable with communications systems having beams with any number of sub-beams, e.g., 2, 3, 4, 5, and so on, sub-beams per beam. Additionally, in communications system 800, each beam has the same number of sub-beams. However, the example embodiments are operable in deployments where different beams may have different numbers of sub-beams.

FIG. 8B illustrates a second example table 850 of antenna gain difference information. As discussed previously, table 850 includes sub-beam information to refine the antenna gain difference information. As shown in FIG. 8B, table 850 corresponds to communications system 800 of FIG. 8A. Table 850 is a two-dimensional table, where a value stored in entry (I-a, J-b) is the antenna gain difference usable in compensating for the difference in antenna gain present when estimating the pathloss of receive beam I with sub-beam a for a signal with an orientation that best matches receive beam J with sub-beam b. As an example, the value in entry (B3-2, B1-1) 855 is −9.4 and corresponds the compensation needed when estimating the pathloss at the second sub-beam of receive beam B3 for a signal with an orientation that best matches the first sub-beam of receive beam B1. The value in entry (B3-2, B1-2) 860 is −11.45 and illustrates the difference that a change in sub-beam can have on the compensation value. The difference between the orientation the signal between the first sub-beam and the second sub-beam of receive beam B1 is approximately 2 dB. As another example, in order to estimate the pathloss between the transmitting UE and the serving access node using the second sub-beam of receive beam B1 when the cellular beam is the first sub-beam of receive beam B0 (such as shown in FIG. 8A), the transmitting UE estimates the pathloss between the transmitting UE and the serving access node using the first sub-beam of receive beam B0 and adds the value in entry (B1-2, B0-1) 865.

In an embodiment, the transmitting UE identifies AoA information of the signal (e.g., q_d) from serving access node or the signal to the receiving UE, and adds a subset of the AoA information to the antenna gain difference information. In some situations, the transmitting UE may have a limitation on its beams and it is not necessary to store all of the AoA information. As an example, if the transmitting UE does not use sub-beams when communicating with the receiving UE, the transmitting UE will be able to trim sub-beam information from the antenna gain difference information. As another example, because the antenna gain different information is used to compensate for antenna gain differences between the sidelink beam and the cellular beam on the SS source, having addition information regarding the direction of the SS source provides a more accurate estimation. However, as long as the beam used for the sidelink transmission is identified, the exact direction of the receiving UE may not provide any additional accuracy enhancement in the estimation process. Hence, it is possible to reduce the size of the antenna gain difference information without suffering a reduction in the estimation accuracy. As an example, AoA information of the SS source direction may be added to the antenna gain difference information, but AoA information of the receiving UE direction may be eliminated in order to reduce the amount of information in the antenna gain difference information. Reducing the amount of information in the antenna gain difference information reduces the storage requirement.

Figure 9A:
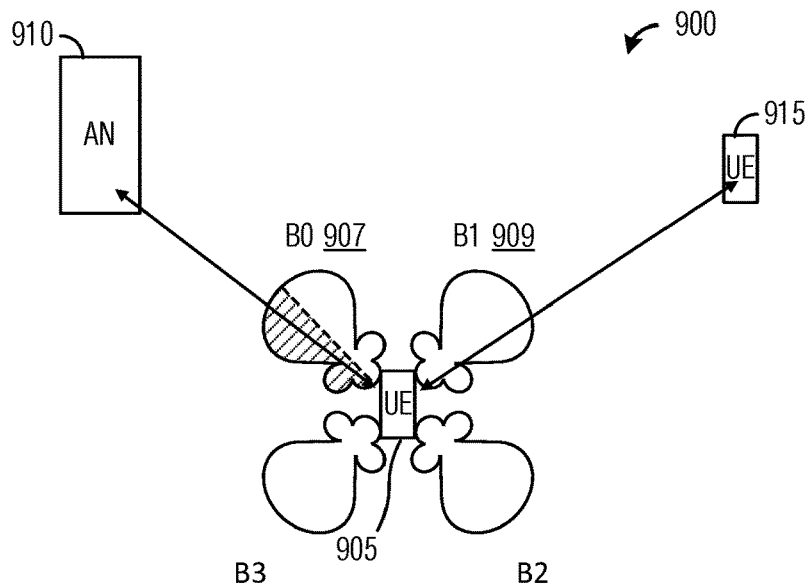
FIG. 9A illustrates a communications system highlighting an example of how a transmitting UE estimates the pathloss between the transmitting UE and a serving access node while transmitting using a sidelink beam, where the antenna gain difference information includes a subset of AoA information according to example embodiments presented herein.

FIG. 9A illustrates a communications system 800 highlighting an example of how a transmitting UE estimates the pathloss between the transmitting UE and a serving access node while transmitting using a sidelink beam, where the antenna gain difference information includes a subset of AoA information. Communications system 900 includes a transmitting UE 905 communicating with a serving access node 910 and a receiving UE 915. Transmitting UE 905 communicates using beams, such as beam B1 907 and B2 909. Each beam has a 90 degree beamwidth, and each beam is sub-divided into two sub-beams, e.g., (−45, 0) and (0, 45). However, transmitting UE 905 does not use the AoA information for the different rows when communicating with receiving UE 915. Instead, transmitting UE 905 uses a beam in its entirety when communicating with receiving UE 915. Therefore, only a subset of the AoA information for the cellular beam or SS source directions (the different columns) is added to the antenna gain difference information. Transmitting UE 905 is able to utilize the sub-beam information to refine the antenna gain difference information. Although the discussion of communications system 900 focuses on a situation where each beam is sub-divided into two sub-beams, the example embodiments presented herein are operable with communications systems having beams with any number of sub-beams, e.g., 2, 3, 4, 5, and so on, sub-beams per beam. Additionally, in communications system 900, each beam has the same number of sub-beams. However, the example embodiments are operable in deployments where different beams may have different numbers of sub-beams.

FIG. 9B illustrates a third example table 950 of antenna gain difference information. As discussed previously, table 950 includes a subset of AoA information (sub-beam information) to refine the antenna gain difference information. As shown in FIG. 9B, table 950 corresponds to communications system 900 of FIG. 9A. Table 950 is a two-dimensional table, where a value stored in entry (I, J-a) is the antenna gain difference usable in compensating for the difference in antenna gain present when estimating the pathloss of receive beam I for a signal with an orientation that best matches receive beam J with sub-beam a. As an example, the value in entry (B3, B1-1) 955 is −10.6 and corresponds the compensation needed when estimating the pathloss at the receive beam B3 for a signal with an orientation that best matches the first sub-beam of receive beam B1. As another example, in order to estimate the pathloss between the transmitting UE and the serving access node using the receive beam B1 when the cellular beam is the first sub-beam of receive beam B0 (such as shown in FIG. 9A), the transmitting UE estimates the pathloss between the transmitting UE and the serving access node using the first sub-beam of receive beam B0 and adds the value in entry (B1, B0-1) 960.

Comparing table 950 to table 850, table 950 has half the number of entries as table 850. The reduction in table size results in a reduction in the storage needed to store the antenna gain difference information. The different is magnified in situations where the transmitting UE supports a larger number of receive beams or there are more sub-beams per receive beam.

According to an example embodiment, a transmitting UE includes a line-of-sight (LOS) detector to determine if a received transmission is LOS or non-LOS (NLOS). The LOS detector determines if a signal received from a serving access node is a LOS transmission or a NLOS transmission. In an embodiment, the transmitting UE uses the determination of the LOS detector to determine if the antenna gain difference information is used. As an example, if the LOS detector determines that the signal received from the serving access node is a LOS transmission, the transmitting UE uses the antenna gain difference information in estimating the pathloss between the transmitting UE and the serving access node. While if the signal received from the serving access node is a NLOS transmission, the transmitting UE does not use the antenna gain difference information. In another embodiment, the transmitting UE uses the determination of the LOS detector to determine if AoA information in the antenna gain difference information is used. As an example, if the LOS detector determines that the signal received from the serving access node is a LOS transmission, the transmitting UE uses the AoA information in the antenna gain difference information in estimating the pathloss between the transmitting UE and the serving access node. While if the signal received from the serving access node is a NLOS transmission, the transmitting UE does not use the AoA information in the antenna gain difference information.

According to an example embodiment, a transmitting UE estimates the pathloss between the transmitting UE and a serving access node using a sidelink beam instead of a cellular beam only when a compensation condition is not met, where the transmitting UE uses antenna gain difference information to compensate for the difference in antenna gain of the sidelink beam and the cellular beam. In other words, if a specified compensation condition (or more than one compensation conditions) is not met, then the UE estimates the pathloss between the transmitting UE and the serving access node using the sidelink beam rather than the cellular beam. While if the specified compensation condition (or more than one compensation conditions) is met, then the UE estimates the pathloss between the transmitting UE and the serving access node using the cellular beam and the antenna gain difference information. The compensation condition or conditions is intended to capture the relationship(s) between the sidelink beam and the cellular beam. The relationship(s) include spatial, channel quality, antenna gain, or combinations thereof. Examples of the compensation condition include:

The sidelink beam and the cellular beams are not adjacent;
The signal quality of a received signal received using the sidelink beam does not meet a threshold;
The antenna gain of the sidelink beam in the AoA of a received signal does not meet a threshold;
The sidelink beam is a specified angle or more away from the cellular beam;
The sidelink beam is a specified angle or more away from the AoA of a receive signal; or
Any combination of the above.

According to an example embodiment, the transmitting UE generates the antenna gain difference information prior to measuring signals (e.g., power control RSs) from the serving access node or receiving UE.

According to an example embodiment, the transmitting UE measures signals (e.g., power control RSs) using the sidelink beam on occasion and updates the antenna gain difference information in accordance with the measurements. The transmitting UE may use the updated antenna gain difference information in estimating the pathloss between the transmitting UE and the serving access node for sidelink transmissions until a subsequent measurement of the signals using the sidelink beam, for example. The transmitting UE may measure the signals using the sidelink beam periodically, upon the occurrence of an event, upon receipt of an instruction, etc. Examples of an event include, but are not limited to, an error rate meeting a specified threshold, a data rate failing to meet a specified threshold, a specified amount of time has elapsed, a specified amount of time has elapsed since the last time the transmitting UE measured signals using the sidelink beam, and so on. The transmitting UE may receive an instruction from the serving access node, another access node, a network entity in the communications network, and so forth.

According to an example embodiment, the transmitting UE uses age and channel condition in determining the transmit power of a sidelink transmission. If the condition of the channel changes slowly, it is possible to use previously estimated or measured values (such as pathloss) without incurring a significant performance penalty. The use of previously estimated or measured values helps to reduce overhead associated in estimating or measuring the values, thereby leading to improved performance.

In an embodiment, the transmitting UE determines the transmit power of a sidelink transmission based on a previously estimated the pathloss between the transmitting UE and the serving access node using the sidelink beam if the age of the previously estimated pathloss is less than a specified age. As long as the previously estimated pathloss meets an age threshold, the transmitting UE may continue to use it in determining the transmit power of sidelink transmissions. In an embodiment, the previously estimated pathloss is the most recently estimated pathloss using the sidelink beam.

In an embodiment, the transmitting UE continues to use the previously estimated pathloss to determine the transmit power if pathlosses between the transmitting UE and the serving access node estimated using the cellular beam remain fairly constant. In an embodiment, if consecutive estimated pathlosses estimated using the cellular beam differ by less than a specified threshold, then the pathlosses estimated using the cellular beam are fairly constant and the transmitting UE continues to use the previously estimated pathloss estimated using the sidelink beam to determine the transmit power. The estimated pathlosses estimated using the cellular beam may serve as an indicator of the condition of the channel, and if they are changing too drastically (e.g., when consecutive values differ by more than the specified threshold) the channel condition may be changing too dramatically to continue using the previously estimated pathloss estimated using the sidelink beam to determine the transmit power. If channel condition is changing too quickly, the transmitting UE resorts to determines the transmit power of a sidelink transmission based on a newly estimated the pathloss between the transmitting UE and the serving access node using the sidelink beam, for example.

As an example, the transmitting UE estimates the pathloss between the transmitting UE and the serving access node using the sidelink beam at a first time To. The transmitting UE also estimates the pathloss between the transmitting UE and the serving access node using the cellular beam at times T1 and T2, where times T1 and T2 are later in time than To. The transmitting UE uses the estimated pathloss estimated using the sidelink beam to determine the transmit power for a sidelink transmission at time T3 if the difference between the estimated pathlosses at times T1 and T2 is less than a specified threshold, where time T3 is later than time T2.

As another example, the transmitting UE estimates the pathloss to the serving access node using the sidelink beam according to a first period. Between any two consecutive such estimated pathlosses, the transmitting UE estimates the pathloss to the serving access node using the cellular beam according to a second period, where the second period is shorter than the first period. If the estimated pathlosses made using the cellular beam are stable (i.e., meets a criteria, such as, changes less than a threshold or fall within a window) the transmitting UE uses a most recent estimated pathloss made using the sidelink beam to determine the transmit power of a sidelink transmission. If the estimated pathlosses made using the cellular beam are not stable (i.e., fails to meet a criteria, such as, changes by more than the threshold or falls outside the window) the transmitting UE estimates the pathloss to the serving access node using the sidelink beam and uses the estimated pathloss to determine the transmit power of a sidelink transmission. Hence, the transmitting UE only has to estimate the pathloss using the cellular beam unless the channel condition changes significantly or the age of the most recent estimated pathloss made using the sidelink beam is too old.

In an embodiment, when the transmitting UE determines that the estimated pathlosses made using the cellular beam are not stable and has to estimate the pathloss to the serving access node using the sidelink beam, the transmitting UE continues to use the estimation time in accordance with when the transmitting UE made the estimation of the pathloss to the serving access node using the sidelink beam. As an example, if an estimation period using the sidelink beam is 100 msec, then the transmitting UE estimates (or intends to estimate) the pathloss using the sidelink beam measurements at integer multiples of the estimation period plus an initial time (0 msec) (e.g., times 0, 100 msec, 200 msec, 300 msec, 400 msec, and so on). However, if at time 230 msec the transmitting UE determines that the estimated pathlosses using the cellular beam are not stable, the transmitting UE estimates the pathloss to the serving access node using the sidelink beam at that time. The transmitting UE continues to use the estimation times for estimating the pathloss using the sidelink beam measurements as previously determined (e.g., times 300 msec, 400 msec, and so on).

In an embodiment, when the transmitting UE determines that the estimated pathlosses made using the cellular beam are not stable and has to estimate the pathloss to the serving access node using the sidelink beam, the transmitting UE resets the estimation time in accordance with when the transmitting UE made the estimation of the pathloss to the serving access node using the sidelink beam. As an example, if an estimation period using the sidelink beam is 100 msec, then the transmitting UE estimates (or intends to estimate) the pathloss using the sidelink beam measurements at integer multiples of the estimation period plus an initial time (0 msec) (e.g., times 0, 100 msec, 200 msec, 300 msec, 400 msec, and so on). However, if at time 230 msec the transmitting UE determines that the estimated pathlosses using the cellular beam are not stable, the transmitting UE estimates the pathloss to the serving access node using the sidelink beam at that time. The transmitting UE then resets initial time to 230 msec and re-determines the estimation times for estimating the pathloss using the sidelink beam measurements as integer multiples of the estimation period plus the initial time (230 msec) (e.g., times 330 msec, 430 msec, and so on).

Figure 10:
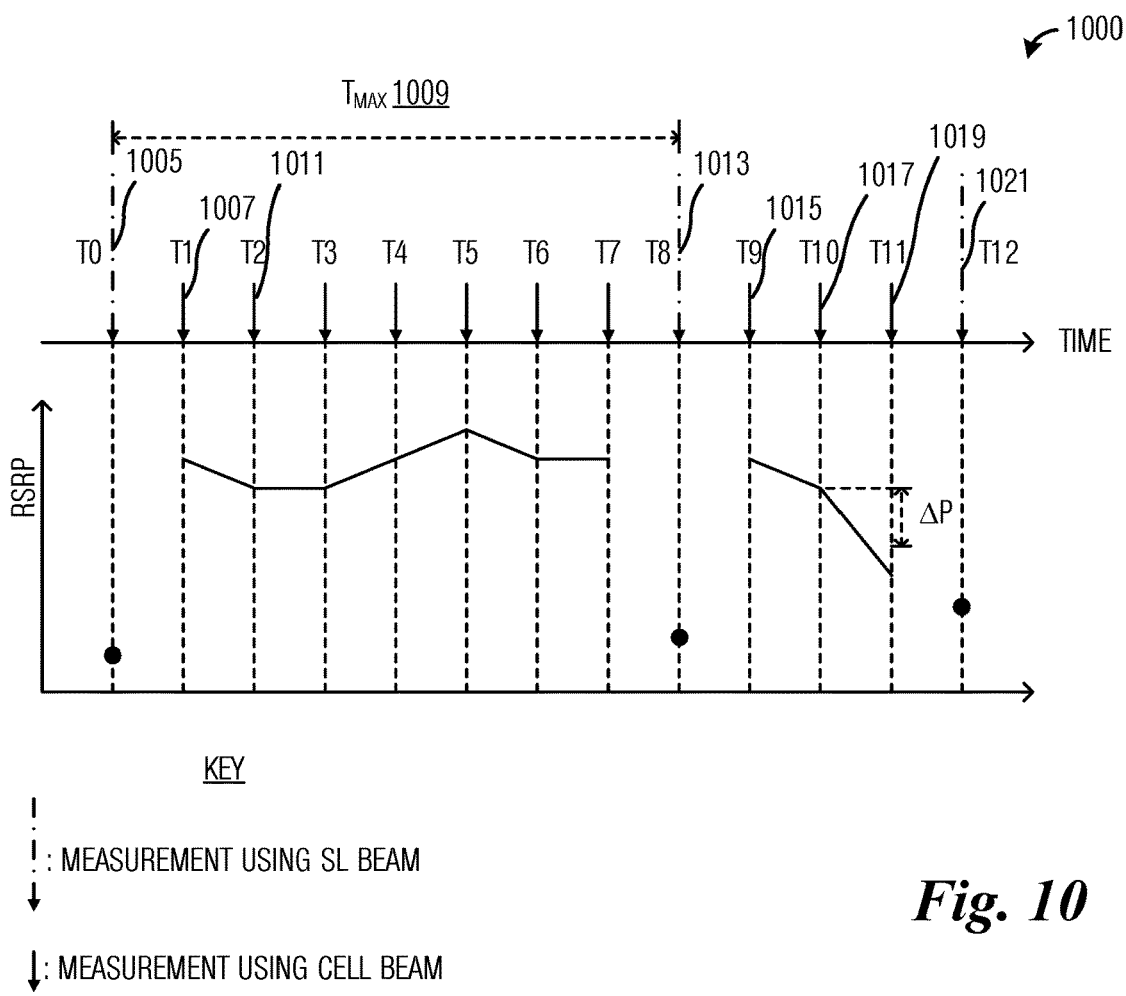
FIG. 10 illustrates a data plot highlighting the operation of the transmitting UE using age and channel condition in determining the transmit power of a sidelink transmission according to example embodiments presented herein.

FIG. 10 illustrates a data plot 1000 highlighting the operation of the transmitting UE using age and channel condition in determining the transmit power of a sidelink transmission. Data plot 1000 displays RSRP values as a function of time. At specified times (e.g., T0, T1, T2, and so on) the transmitting UE either estimates the pathloss between the transmitting UE and the serving access node using the sidelink beam or estimates the pathloss between the transmitting UE and the serving access node using the cellular beam. As discussed previously, estimating the pathloss using the cellular beam is a simpler process than estimating the pathloss using the sidelink beam.

As shown in FIG. 10, at time T0 1005, the transmitting UE estimates the pathloss between the transmitting UE and the serving access node using the sidelink beam. The transmitting UE determines the transmit power in accordance with the estimated pathloss. At time T1 1007, the transmitting UE estimates the pathloss between the transmitting UE and the serving access node using the cellular beam and determines the transmit power in accordance with the estimated pathloss estimated in time T0 1005 because the difference between T1 1007 and T0 1005 is less than a time threshold $T_{MAX}$ 1009. At time T2 1011, the transmitting UE estimates the pathloss between the transmitting UE and the serving access node using the cellular beam. The transmitting UE compares the estimated pathlosses estimated at times T1 and T2 and determines that they differ by less than a threshold $\Delta P$. Additionally, the difference between time T2 1011 and T0 1005 is less than the time threshold $T_{MAX}$ 1009. Because the estimated pathlosses differ by less than the threshold and the age of the estimated pathloss estimated using the sidelink beam is less than the time threshold $T_{MAX}$ 1009, the transmitting UE determines the transmit power in accordance with the estimated pathloss estimated in time T0 1005.

At time T8 1013, the age of the estimated pathloss estimated using the sidelink beam is more than the time threshold $T_{MAX}$ 1009, hence the transmitting UE estimates the pathloss between the transmitting UE and the serving access node using the sidelink beam. At time T9 1015, the transmitting UE estimates the pathloss between the transmitting UE and the serving access node using the cellular beam and determines the transmit power in accordance with the estimated pathloss estimated in time T8 1013 because the difference between T9 1015 and T8 1013 is less than a time threshold $T_{MAX}$ 1009. At time T10 1017, the transmitting UE estimates the pathloss between the transmitting UE and the serving access node using the cellular beam. The transmitting UE compares the estimated pathlosses estimated at times T10 and T9 and determines that they differ by less than a threshold $\Delta P$. Additionally, the difference between time T10 1017 and T8 1013 is less than the time threshold $T_{MAX}$ 1009. Because the estimated pathlosses differ by less than the threshold and the age of the estimated pathloss estimated using the sidelink beam is less than the time threshold $T_{MAX}$ 1009, the transmitting UE determines the transmit power in accordance with the estimated pathloss estimated in time T8 1013. At time T11 1019, the the transmitting UE estimates the pathloss between the transmitting UE and the serving access node using the cellular beam. The transmitting UE compares the estimated pathlosses estimated at times T11 and T10 and determines that they differ by more than the threshold $\Delta P$. Because the estimated pathlosses estimated at times T11 and T10 differ by more than the threshold $\Delta P$, at time T12 1021, the transmitting UE estimates the pathloss between the transmitting UE and the serving access node using the sidelink beam.

In an embodiment, the transmitting UE periodically estimates the pathloss between the transmitting UE and the serving access node using the cellular beam. In an embodiment, the estimates of the pathloss using the cellular beam and the sidelink beam are made using the same reference signal.

In an embodiment, the pathlosses estimated using the cellular beam are fairly constant if a most recent estimated pathloss based on the cellular beam and an initial estimated pathloss based on the cellular beam that is estimated after a most recent estimated pathloss based on the sidelink beam differ by less than a specified threshold. As an example, referencing FIG. 10, at time T6, the transmitting UE compares the estimated RSRP made at time T6 (the most recent estimated pathloss based on the cellular beam) and time T1 (the initial estimated pathloss based on the cellular beam that is estimated after a most recent estimated pathloss based on the sidelink beam), and if the difference is less than the specified threshold, the pathlosses are fairly constant.

In an embodiment, when the pathlosses estimated using the cellular beam are fairly constant, channel fluctuations of the cellular beam (i.e., the difference between the pathloss estimates made using the cellular beam) are compensated for in addition to the most recently estimated pathloss made using the sidelink beam. As an example, referencing FIG. 10, at time T2, the transmitting UE compares the estimated RSRP made at times T1 and T2, where P0 is the difference in the estimated RSRPs. If the estimated RSRPs made at times T1 and T2 are fairly constant, then the transmitting UE applies compensation to P0 in addition to the most recently estimated pathloss based on the sidelink beam (made at time T0).

Figures 11A, 11B:
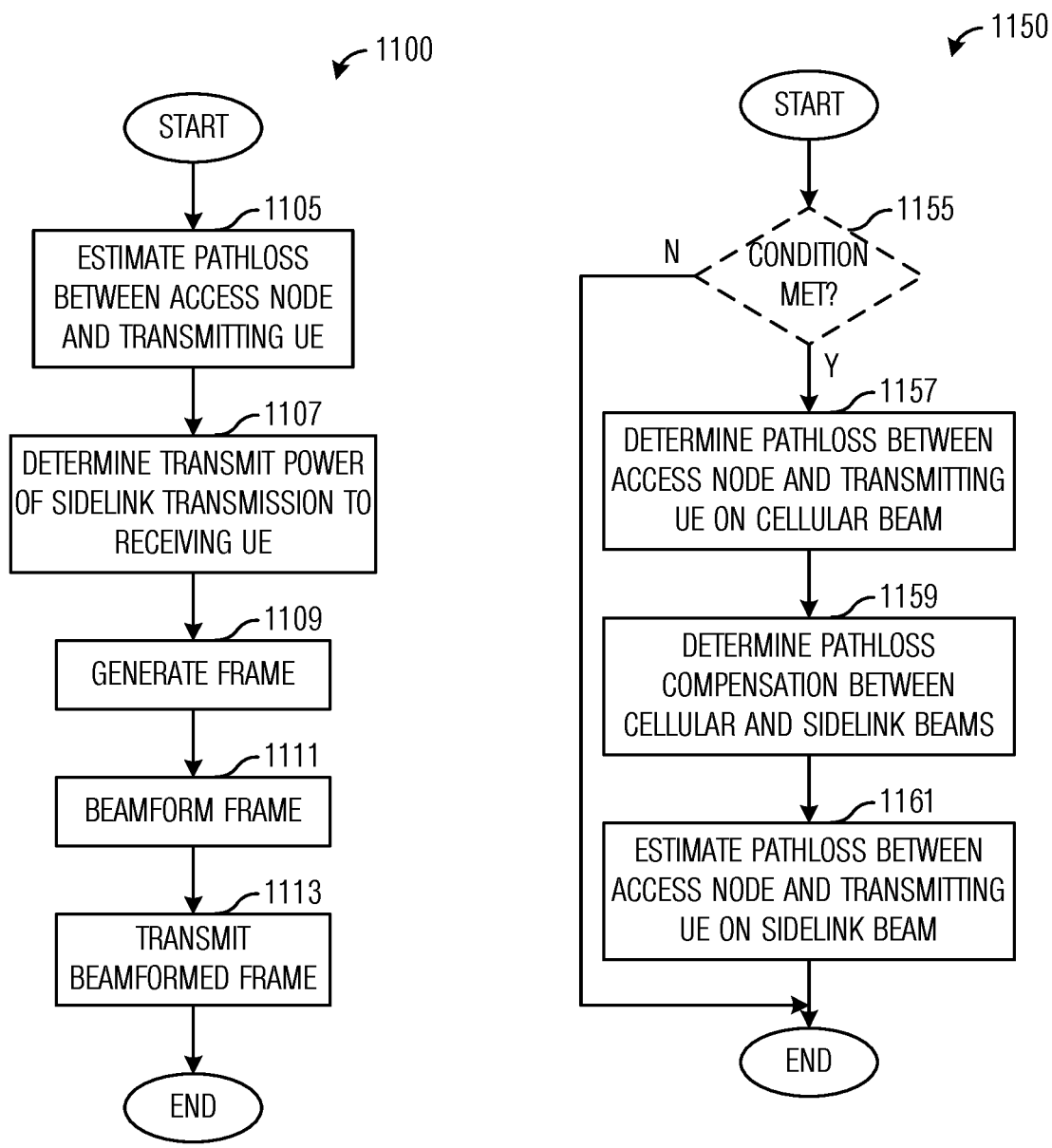
FIG. 11A illustrates a flow diagram of example operations occurring in a transmitting UE as the transmitting UE transmits a beamformed frame to a receiving UE over a sidelink beam according to example embodiments presented herein.
FIG. 11B illustrates a flow diagram of example operations occurring in a transmitting UE as the transmitting UE estimates a pathloss between the transmitting UE and a serving access node over a sidelink beam according to example embodiments presented herein.

FIG. 11A illustrates a flow diagram of example operations 1100 occurring in a transmitting UE as the transmitting UE transmits a beamformed frame to a receiving UE over a sidelink beam. Operations 1100 may be indicative of operations occurring in a transmitting UE as the transmitting UE transmits a beamformed frame to a receiving UE over a sidelink beam.

Operations 1100 begin with the transmitting UE estimating a pathloss between the transmitting UE and the serving access node using the sidelink beam (block 1105). The estimating of the pathloss between the transmitting UE and the serving access node using the sidelink beam allows the UE to quantify the interference impact of a transmission over the sidelink beam on the serving access node. Simply estimating the pathloss between the transmitting UE and the serving access node using the cellular beam may not be able to accurately quantify the interference impact of the sidelink transmission on the serving access node because the beam gain of the sidelink beam and the cellular beam as seen by the serving access node may be different. A detailed discussion of an example embodiment for the estimating of the pathloss between the transmitting UE and the serving access node using the sidelink beam is provided below.

The transmitting UE determines the transmit power of a sidelink transmission to a receiving UE (block 1107). The transmitting UE determines the transmit power of the sidelink transmission to the receiving UE, which occurs over the sidelink beam. The transmit power of the sidelink transmission may be in accordance with the estimated pathloss between the transmitting UE and the serving UE using the sidelink beam, as well as an estimated pathloss between the transmitting UE and the serving UE using the cellular beam. The transmit power may be determined to minimize interference to the serving access node, while maximizing the transmit power to the receiving UE.

The transmitting UE generates a frame (block 1109). The frame includes information, such as data, control, or a combination of data and control, to be transmitted to the receiving UE. The transmitting UE beamforms the frame (block 1111). Beamforming the frame may involve encoding the frame as generated by the transmitting UE, and applying beamforming coefficients of a transmit antenna panel to the encoded frame, for example. The transmitting UE transmits the beamformed frame (block 1113).

FIG. 11B illustrates a flow diagram of example operations 1150 occurring in a transmitting UE as the transmitting UE estimates a pathloss between the transmitting UE and a serving access node over a sidelink beam. Operations 1150 may be indicative of operations occurring in a transmitting UE as the transmitting UE estimates a pathloss between the transmitting UE and the serving access node over a sidelink beam. Operations 1150 may be an example implementation of block 1105 of operations 1100.

Operations 1150 may begin with the transmitting UE performing a check to determine if a compensation condition (or more than one compensation conditions) has been met (block 1155). If the compensation condition (or more than one compensation conditions) has not been met, the transmitting UE estimates the pathloss between the transmitting UE and a serving access node over the sidelink beam. If the compensation condition (or more than one compensation conditions) has been met, the transmitting UE estimates the pathloss between the transmitting UE and a serving access node over the cellular beam and the antenna gain difference information.

If the compensation condition (or more than one compensation conditions) has been met, the transmitting UE determines a pathloss between the transmitting UE and a serving access node over the cellular beam (block 1159). The pathloss over the cellular beam may be determined through measurements made by the transmitting UE. Alternatively, the transmitting UE may use a previously determined pathloss over the cellular beam. As long as the channel condition remains stable, the previously determined pathloss may remain valid. An additional condition on the validity of previously determined pathlosses is the age of the previously determined pathloss, i.e., how long ago was the pathloss over the cellular beam determined.

The transmitting UE determines a pathloss compensation (block 1159). The pathloss compensation may be obtained from the antenna gain difference information, such as the tables shown in FIG. 7C, 8B, or 9B. The transmitting UE looks up the antenna gain difference information in accordance with the cellular beam and the sidelink beam, for example. The transmitting UE estimates the pathloss between the transmitting UE and the serving access node over the sidelink beam (block 1161). As an example, the pathloss between the transmitting UE and the serving access node over the sidelink beam is estimated as a sum of the pathloss over the cellular beam and the pathloss compensation.

Figure 12:
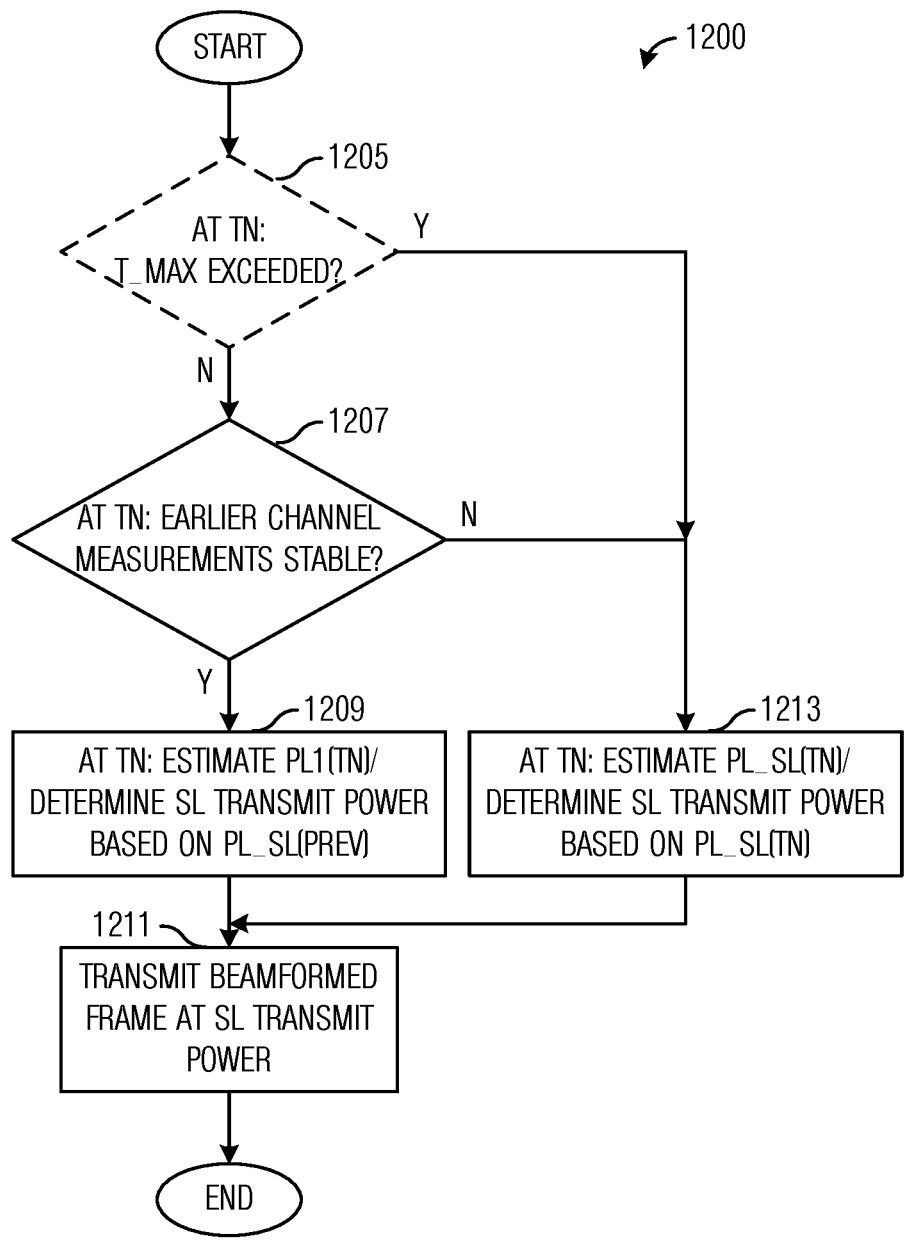
FIG. 12 illustrates a flow diagram of example operations occurring in a transmitting UE as the transmitting UE uses age and channel condition in determining the transmit power of a sidelink transmission according to example embodiments presented herein.

FIG. 12 illustrates a flow diagram of example operations 1200 occurring in a transmitting UE as the transmitting UE uses age and channel condition in determining the transmit power of a sidelink transmission. Operations 1200 may be indicative of operations occurring in a transmitting UE as the transmitting UE uses age and channel condition in determining the transmit power of a sidelink transmission.

Operations 1200 may begin (at current time $T_N$) with the transmitting UE performing a check to determine if the age of a previously estimated pathloss (estimated at time $T_M$, where $T_N$ is later in time than $T_M$) between the transmitting UE and the serving access node over the sidelink beam is less than a specified age, i.e., is $T_{MAX}$ exceeded (block 1205). If the age of the previously estimated pathloss is less than the specified age, the transmitting UE performs another check to determine if the channel condition is stable (block 1207). As an example, the channel condition is stable if changes between consecutively estimated pathlosses between the transmitting UE and the serving access node made at times $T_L$ and $T_K$ (where $T_N$ is later in time than $T_L$ and $T_K$) are less than a specified threshold. In order to achieve optimal performance $T_L$ and $T_K$ should be a pathloss estimating time instance immediate preceding $T_N$. As another example, the channel condition is stable if changes between the estimated pathlosses between the transmitting UE and the serving access node made prior to $T_N$ fall within a specified window.

If the channel condition is stable (and potentially if the age of the previously estimated pathloss is less than the specified age), the transmitting UE estimates the pathloss between the transmitting UE and the serving access node over the cellular beam for time $T_N$ and determines the transmit power for a sidelink transmission to the receiving UE in accordance with the previously estimated pathloss between the transmitting UE and the serving access node over the sidelink beam (estimated at time $T_M$) (block 1209). The transmitting UE transmits a beamformed frame to the receiving UE, where the transmission occurs at the transmit power determined in block 1209 (block 1211).

If the channel condition is unstable (or if the age of the previously estimated pathloss is more than the specified age), the transmitting UE estimates the pathloss between the transmitting UE and the serving access node over the sidelink beam for time $T_N$ and determines the transmit power for a sidelink transmission to the receiving UE in accordance with the estimated pathloss between the transmitting UE and the serving access node over the sidelink beam for time $T_N$ (block 1213). The estimated pathloss between the transmitting UE and the serving access node over the sidelink beam for time $T_N$ now becomes the previously estimated pathloss (estimated at time $T_M$) in subsequent iterations of operations 1200. The transmitting UE transmits a beamformed frame to the receiving UE, where the transmission occurs at the transmit power determined in block 1209 (block 1211).

Figure 13:
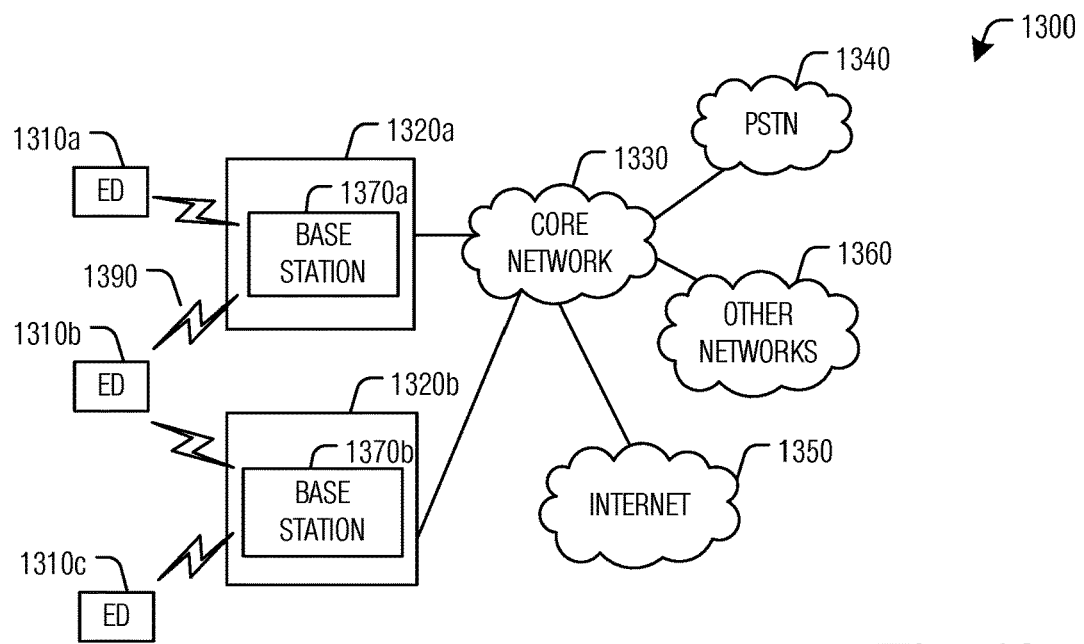
FIG. 13 illustrates an example communication system according to example embodiments presented herein.

FIG. 13 illustrates an example communication system 1300. In general, the system 1300 enables multiple wireless or wired users to transmit and receive data and other content. The system 1300 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1300 includes electronic devices (ED) 1310a-1310c, radio access networks (RANs) 1320a-1320b, a core network 1330, a public switched telephone network (PSTN) 1340, the Internet 1350, and other networks 1360. While certain numbers of these components or elements are shown in FIG. 13, any number of these components or elements may be included in the system 1300.

The EDs 1310a-1310c are configured to operate or communicate in the system 1300. For example, the EDs 1310a-1310c are configured to transmit or receive via wireless or wired communication channels. Each ED 131oa-1310c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1320a-1320b here include base stations 1370a-1370b, respectively. Each base station 1370a-1370b is configured to wirelessly interface with one or more of the EDs 1310a-1310c to enable access to the core network 1330, the PSTN 1340, the Internet 1350, or the other networks 1360. For example, the base stations 1370a-1370b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1310a-1310c are configured to interface and communicate with the Internet 1350 and may access the core network 1330, the PSTN 1340, or the other networks 1360.

In the embodiment shown in FIG. 13, the base station 1370a forms part of the RAN 1320a, which may include other base stations, elements, or devices. Also, the base station 1370b forms part of the RAN 1320b, which may include other base stations, elements, or devices. Each base station 1370a-1370b operates to transmit or receive wireless signals within a particular geographic region or area, sometimes referred to as a "cell." In some embodiments, multiple-input multiple-output (MIMO) technology may be employed having multiple transceivers for each cell.

The base stations 1370a-1370b communicate with one or more of the EDs 1310a-1310c over one or more air interfaces 1390 using wireless communication links. The air interfaces 1390 may utilize any suitable radio access technology.

It is contemplated that the system 1300 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1320a-1320b are in communication with the core network 1330 to provide the EDs 1310a-1310c with voice, data, application, Voice over Internet Protocol (VoIP), or other services. Understandably, the RANs 1320a-1320b or the core network 1330 may be in direct or indirect communication with one or more other RANs (not shown). The core network 1330 may also serve as a gateway access for other networks (such as the PSTN 1340, the Internet 1350, and the other networks 1360). In addition, some or all of the EDs 1310a-1310c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1350.

Although FIG. 13 illustrates one example of a communication system, various changes may be made to FIG. 13. For example, the communication system 1300 could include any number of EDs, base stations, networks, or other components in any suitable configuration.

Figure 14A:
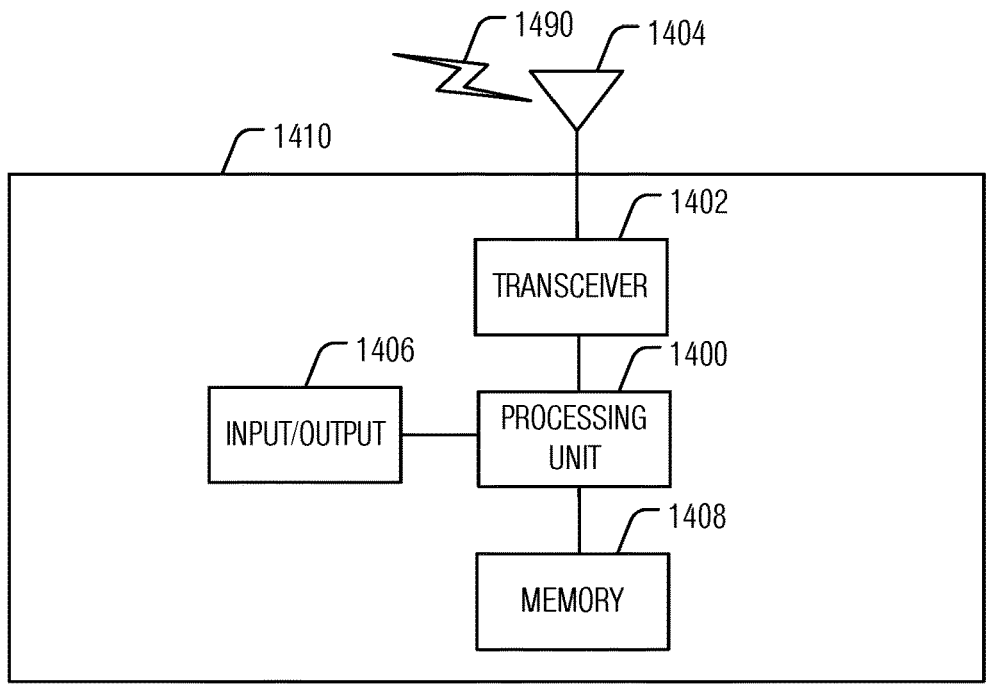
FIGS. 14A and 14B illustrate example devices that may implement the methods and teachings according to this disclosure.
Figure 14B:
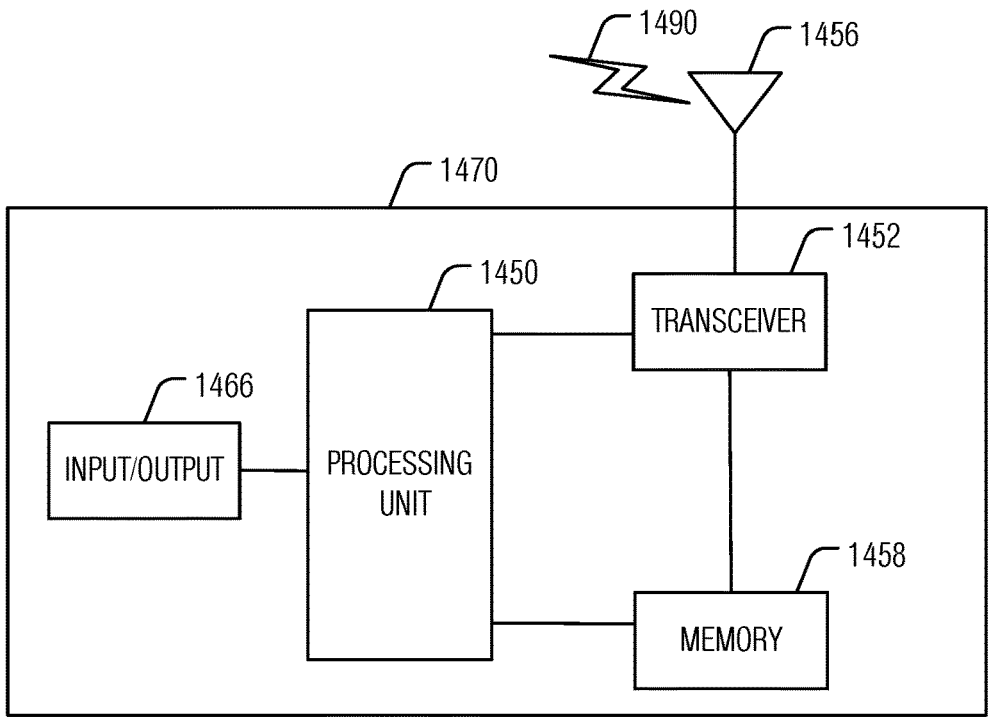

FIGS. 14A and 14B illustrate example devices that may implement the methods and teachings according to this disclosure. In particular, FIG. 14A illustrates an example ED 1410, and FIG. 14B illustrates an example base station 1470. These components could be used in the system 1300 or in any other suitable system.

As shown in FIG. 14A, the ED 1410 includes at least one processing unit 1400. The processing unit 1400 implements various processing operations of the ED 1410. For example, the processing unit 1400 could perform signal coding, data processing, power control, input/output processing, or any other functionality enabling the ED 1410 to operate in the system 1300. The processing unit 1400 also supports the methods and teachings described in more detail above. Each processing unit 1400 includes any suitable processing or computing device configured to perform one or more operations. Each processing unit 1400 could, for example, include a microprocessor, microcontroller, digital signal processor, field programmable gate array, or application specific integrated circuit.

The ED 1410 also includes at least one transceiver 1402. The transceiver 1402 is configured to modulate data or other content for transmission by at least one antenna or NIC (Network Interface Controller) 1404. The transceiver 1402 is also configured to demodulate data or other content received by the at least one antenna 1404. Each transceiver 1402 includes any suitable structure for generating signals for wireless or wired transmission or processing signals received wirelessly or by wire. Each antenna 1404 includes any suitable structure for transmitting or receiving wireless or wired signals. One or multiple transceivers 1402 could be used in the ED 1410, and one or multiple antennas 1404 could be used in the ED 1410. Although shown as a single functional unit, a transceiver 1402 could also be implemented using at least one transmitter and at least one separate receiver.

The ED 1410 further includes one or more input/output devices 1406 or interfaces (such as a wired interface to the Internet 1350). The input/output devices 1406 facilitate interaction with a user or other devices (network communications) in the network. Each input/output device 1406 includes any suitable structure for providing information to or receiving information from a user, such as a speaker, microphone, keypad, keyboard, display, or touch screen, including network interface communications.

In addition, the ED 1410 includes at least one memory 1408. The memory 1408 stores instructions and data used, generated, or collected by the ED 1410. For example, the memory 1408 could store software or firmware instructions executed by the processing unit(s) 1400 and data used to reduce or eliminate interference in incoming signals. Each memory 1408 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 14B, the base station 1470 includes at least one processing unit 1450, at least one transceiver 1452, which includes functionality for a transmitter and a receiver, one or more antennas 1456, at least one memory 1458, and one or more input/output devices or interfaces 1466. A scheduler, which would be understood by one skilled in the art, is coupled to the processing unit 1450. The scheduler could be included within or operated separately from the base station 1470. The processing unit 1450 implements various processing operations of the base station 1470, such as signal coding, data processing, power control, input/output processing, or any other functionality. The processing unit 1450 can also support the methods and teachings described in more detail above. Each processing unit 1450 includes any suitable processing or computing device configured to perform one or more operations. Each processing unit 1450 could, for example, include a microprocessor, microcontroller, digital signal processor, field programmable gate array, or application specific integrated circuit.

Each transceiver 1452 includes any suitable structure for generating signals for wireless or wired transmission to one or more EDs or other devices. Each transceiver 1452 further includes any suitable structure for processing signals received wirelessly or by wire from one or more EDs or other devices. Although shown combined as a transceiver 1452, a transmitter and a receiver could be separate components. Each antenna 1456 includes any suitable structure for transmitting or receiving wireless or wired signals. While a common antenna 1456 is shown here as being coupled to the transceiver 1452, one or more antennas 1456 could be coupled to the transceiver(s) 1452, allowing separate antennas 1456 to be coupled to the transmitter and the receiver if equipped as separate components. Each memory 1458 includes any suitable volatile or non-volatile storage and retrieval device(s). Each input/output device 1466 facilitates interaction with a user or other devices (network communications) in the network. Each input/output device 1466 includes any suitable structure for providing information to or receiving/providing information from a user, including network interface communications.

Figure 15:
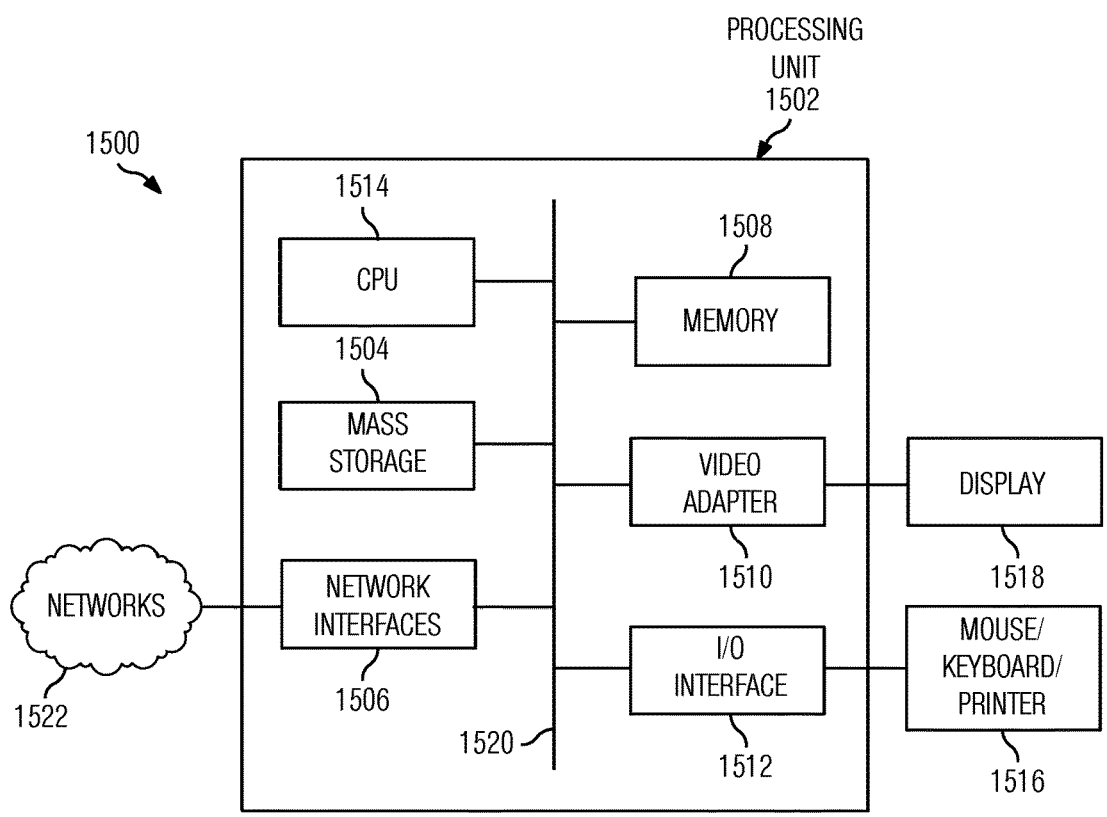
FIG. 15 is a block diagram of a computing system that may be used for implementing the devices and methods disclosed herein.

FIG. 15 is a block diagram of a computing system 1500 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1500 includes a processing unit 1502. The processing unit includes a central processing unit (CPU) 1514, memory 1508, and may further include a mass storage device 1504, a video adapter 1510, and an I/O interface 1512 connected to a bus 1520.

The bus 1520 may be one or more of any type of several bus architectures including a memory bus or memory controller, a peripheral bus, or a video bus. The CPU 1514 may comprise any type of electronic data processor. The memory 1508 may comprise any type of non-transitory system memory such as static random access memory (SRAM), dynamic random access memory (DRAM), synchronous DRAM (SDRAM), read-only memory (ROM), or a combination thereof. In an embodiment, the memory 1508 may include ROM for use at boot-up, and DRAM for program and data storage for use while executing programs.

The mass storage 1504 may comprise any type of non-transitory storage device configured to store data, programs, and other information and to make the data, programs, and other information accessible via the bus 1520. The mass storage 1504 may comprise, for example, one or more of a solid state drive, hard disk drive, a magnetic disk drive, or an optical disk drive.

The video adapter 1510 and the I/O interface 1512 provide interfaces to couple external input and output devices to the processing unit 1502. As illustrated, examples of input and output devices include a display 1518 coupled to the video adapter 1510 and a mouse, keyboard, or printer 1516 coupled to the I/O interface 1512. Other devices may be coupled to the processing unit 1502, and additional or fewer interface cards may be utilized. For example, a serial interface such as Universal Serial Bus (USB) (not shown) may be used to provide an interface for an external device.

The processing unit 1502 also includes one or more network interfaces 1506, which may comprise wired links, such as an Ethernet cable, or wireless links to access nodes or different networks. The network interfaces 1506 allow the processing unit 1502 to communicate with remote units via the networks. For example, the network interfaces 1506 may provide wireless communication via one or more transmitters/transmit antennas and one or more receivers/receive antennas. In an embodiment, the processing unit 1502 is coupled to a local-area network 1522 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an estimating unit or module, a determining unit or module, or a measuring unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method implemented by a first device, the method comprising:
    estimating, by the first device, a first pathloss between the first device and a serving access node with respect to a sidelink beam between the first device and a second device, the estimating the first pathloss comprising:
        measuring, by the first device, a reference signal utilizing the sidelink beam, the reference signal being received from the serving access node;
    determining, by the first device, a sidelink transmit power for a sidelink transmission between the first device and the second device in accordance with the first pathloss; and
    transmitting, by the first device, to the second device over the sidelink beam, the sidelink transmission in accordance with the sidelink transmit power.

2. The method of claim 1, the estimating the first pathloss comprising:
    estimating, by the first device, a pathloss compensation between the sidelink beam and a cellular beam, the cellular beam being used by the first device to communicate with the serving access node; and
    determining, by the first device, the first pathloss in accordance with the pathloss compensation when a compensation condition is met.

3. The method of claim 2, the pathloss compensation comprising an antenna gain difference between the sidelink beam and the cellular beam.

4. The method of claim 2, the pathloss compensation being stored in a memory of the first device.

5. The method of claim 2, wherein the compensation condition comprises at least one of:
    the cellular beam and the sidelink beam are not adjacent to each other,
    a signal quality of a signal received on the sidelink beam does not meet a first specified threshold,
    an antenna gain of the sidelink beam in an angle of arrival (AoA) of the signal does not meet a second specified threshold,
    an orientation of the sidelink beam is more than a first specified angle threshold away from an orientation of the cellular beam, or
    the orientation of the sidelink beam is more than a second specified angle threshold away from the AoA of the signal.

6. The method of claim 1, the first device comprising a transmitting user equipment (UE) and the second device comprising a receiving UE.

7. A method implemented by a first device, the method comprising:
    determining, by the first device, that first channel quality measurements of a cellular beam between the first device and a serving access node that is serving the first device meet a specified criteria, and based thereon,
        determining, by the first device, a first sidelink transmit power of a sidelink beam between the first device and a second device in accordance with a first pathloss between the first device and the serving access node with respect to the sidelink beam between the first device and the second device, the first pathloss being measured prior to the first channel quality measurements of the cellular beam, and
        transmitting, by the first device, to the second device over the sidelink beam, a first frame in accordance with the first sidelink transmit power;
    determining, by the first device, that second channel quality measurements of the cellular beam fail to meet the specified criteria, and based thereon,
        estimating, by the first device, a second pathloss between the first device and the serving access node,
        determining, by the first device, a second sidelink transmit power of the sidelink beam in accordance with the second pathloss, and
        transmitting, by the first device, to the second device over the sidelink beam, a second frame in accordance with the second sidelink transmit power; and
    determining, by the first device, that third channel quality measurements of the cellular beam meet the specified criteria, and based thereon,
        determining, by the first device, a third sidelink transmit power of the sidelink beam in accordance with the second pathloss measured prior to the third channel quality measurements of the cellular beam, and
        transmitting, by the first device, to the second device over the sidelink beam, a third frame in accordance with the third sidelink transmit power.

8. The method of claim 7, further comprising:
    determining, by the first device, that an age timer associated with the second pathloss has met an age threshold, and based thereon,
        measuring, by the first device, a third pathloss between the first device and the serving access node,
        determining, by the first device, a fourth sidelink transmit power of the sidelink beam in accordance with the third pathloss, and
        transmitting, by the first device, to the second device over the sidelink beam, a fourth frame in accordance with the fourth sidelink transmit power.

9. A first device comprising:
    a non-transitory memory storage comprising instructions; and
    one or more processors in communication with the non-transitory memory storage, the one or more processors executing the instructions to perform operations including:
        estimating a first pathloss between the first device and a serving access node with respect to a sidelink beam between the first device and a second device, the estimating the first pathloss comprising:
            measuring a reference signal utilizing the sidelink beam, the reference signal being received from the serving access node,
        determining a sidelink transmit power for a sidelink transmission between the first device and the second device in accordance with the first pathloss, and
        transmitting, to the second device over the sidelink beam, the sidelink transmission in accordance with the sidelink transmit power.

10. The first device of claim 9, the estimating the first pathloss comprising:
    estimating a pathloss compensation between the sidelink beam and a cellular beam, and
    determining the first pathloss in accordance with the pathloss compensation when a compensation condition is met, the cellular beam being used by the first device to communicate with the serving access node.

11. The first device of claim 10, the pathloss compensation comprising an antenna gain difference between the sidelink beam and the cellular beam.

12. The first device of claim 10, the compensation condition comprising at least one of:
   the cellular beam and the sidelink beam are not adjacent to each other,
   a signal quality of a signal received on the sidelink beam does not meet a first specified threshold,
   an antenna gain of the sidelink beam in an angle of arrival (AoA) of the signal does not meet a second specified threshold,
   an orientation of the sidelink beam is more than a first specified angle threshold away from an orientation of the cellular beam, or
   the orientation of the sidelink beam is more than a second specified angle threshold away from the AoA of the signal.

13. A first device comprising:
   a non-transitory memory storage comprising instructions; and
   one or more processors in communication with the non-transitory memory storage, the one or more processors executing the instructions to cause the first device to perform operations including:
      determining that first channel quality measurements of a cellular beam between the first device and a serving access node that is serving the first device meet a specified criteria, and based thereon,
         determining a first sidelink transmit power of a sidelink beam between the first device and a second device in accordance with a first pathloss between the first device and the serving access node with respect to the sidelink beam between the first device and the second device, the first pathloss being measured prior to the first channel quality measurements of the cellular beam, and
         transmitting, to the second device over the sidelink beam, a first frame in accordance with the first sidelink transmit power;
      determining that second channel quality measurements of the cellular beam fail to meet the specified criteria, and based thereon,
         estimating a second pathloss between the first device and the serving access node,
         determining a second sidelink transmit power of the sidelink beam in accordance with the second pathloss, and
         transmitting to the second device over the sidelink beam, a second frame in accordance with the second sidelink transmit power; and
      determining that third channel quality measurements of the cellular beam meet the specified criteria, and based thereon,
         determining a third sidelink transmit power of the sidelink beam in accordance with the second pathloss measured prior to the third channel quality measurements of the cellular beam, and
         transmitting to the second device over the sidelink beam, a third frame in accordance with the third sidelink transmit power.

14. The first device of claim 13, the operations further comprising:
   determining that an age timer associated with the second pathloss has met an age threshold, and based thereon,
      measuring a third pathloss between the first device and the serving access node with respect to the sidelink beam,
      determining a fourth sidelink transmit power of the sidelink beam in accordance with the third pathloss, and
      transmitting to the second device over the sidelink beam, a fourth frame in accordance with the fourth sidelink transmit power.

* * * * *